United States Patent
Alwattari

(10) Patent No.: US 10,155,897 B2
(45) Date of Patent: Dec. 18, 2018

(54) HYDROPHOBICALLY AND HYDROPHILICALLY MODIFIED POLYSACCHARIDES AND METHODS OF USING THE SAME FOR TREATMENT OF A SUBTERRANEAN FORMATION

(71) Applicant: Halliburton Energy Services, Inc., Houston, TX (US)

(72) Inventor: Ali Alwattari, The Woodlands, TX (US)

(73) Assignee: Hilliburton Energy Services, Inc., Houston, TX (US)

( * ) Notice: Subject to any disclaimer, the term of this patent is extended or adjusted under 35 U.S.C. 154(b) by 296 days.

(21) Appl. No.: 14/895,135

(22) PCT Filed: Aug. 16, 2013

(86) PCT No.: PCT/US2013/055373
§ 371 (c)(1),
(2) Date: Dec. 1, 2015

(87) PCT Pub. No.: WO2015/023296
PCT Pub. Date: Feb. 19, 2015

(65) Prior Publication Data
US 2016/0102236 A1    Apr. 14, 2016

(51) Int. Cl.
*E21B 43/26* (2006.01)
*E21B 43/04* (2006.01)
(Continued)

(52) U.S. Cl.
CPC .............. *C09K 8/035* (2013.01); *C04B 24/38* (2013.01); *C04B 24/383* (2013.01); *C04B 28/02* (2013.01); *C04B 40/0039* (2013.01); *C09K 8/467* (2013.01); *C09K 8/52* (2013.01); *C09K 8/62* (2013.01); *C09K 8/68* (2013.01);
(Continued)

(58) Field of Classification Search
CPC ........... E21B 43/26; E21B 43/04; C09K 8/62; C09K 8/08; C09K 8/035
See application file for complete search history.

(56) References Cited

U.S. PATENT DOCUMENTS 5,024,276 A    6/1991  Borchardt
9,854,796 B2 *  1/2018  Wu ..................... A01N 25/04
(Continued)

FOREIGN PATENT DOCUMENTS

WO    WO-2006075127 A1    7/2006
WO    WO-2015023296 A1    2/2015

OTHER PUBLICATIONS

"International Application Serial No. PCT/US2013/055373, International Search Report dated May 20, 2014", 3 pgs.
(Continued)

*Primary Examiner* — Catherine Loikith
(74) *Attorney, Agent, or Firm* — Chamberlain Hrdlicka

(57) ABSTRACT

Hydrophobically and hydrophilically modified polysaccharides and methods of using the same for treatment of a subterranean formation. A method of treating a subterranean formation. The method includes obtaining or providing a composition including a hydrophobically and hydrophilically modified polysaccharide (HHMP). The method includes placing the composition in a subterranean formation.

19 Claims, 20 Drawing Sheets

(51) Int. Cl.

| | | |
|---|---|---|
| *C09K 8/62* | (2006.01) | |
| *C09K 8/08* | (2006.01) | |
| *C09K 8/035* | (2006.01) | |
| *C09K 8/467* | (2006.01) | |
| *C09K 8/52* | (2006.01) | |
| *C09K 8/68* | (2006.01) | |
| *C09K 8/72* | (2006.01) | |
| *C09K 8/88* | (2006.01) | |
| *C09K 8/90* | (2006.01) | |
| *C04B 24/38* | (2006.01) | |
| *C04B 28/02* | (2006.01) | |
| *C04B 40/00* | (2006.01) | |
| *E21B 7/00* | (2006.01) | |
| *C04B 103/00* | (2006.01) | |

(52) U.S. Cl.
CPC .............. *C09K 8/685* (2013.01); *C09K 8/725* (2013.01); *C09K 8/887* (2013.01); *C09K 8/90* (2013.01); *E21B 7/00* (2013.01); *E21B 43/04* (2013.01); *E21B 43/26* (2013.01); *C04B 2103/0062* (2013.01); *C09K 2208/08* (2013.01)

(56) References Cited

U.S. PATENT DOCUMENTS

| | | | |
|---|---|---|---|
| 2007/0215355 | A1 | 9/2007 | Shapovalov et al. |
| 2009/0023613 | A1 | 1/2009 | Li et al. |
| 2011/0054042 | A1* | 3/2011 | Wu .................. A01N 25/04 514/772.4 |
| 2011/0092393 | A1 | 4/2011 | Faust, Jr. et al. |
| 2013/0220608 | A1* | 8/2013 | Rincon-Torres ......... C09K 8/70 166/285 |

OTHER PUBLICATIONS

"International Application Serial No. PCT/US2013/055373, Written Opinion dated May 20, 2014", 13 pgs.

Akiyama, E., et al., "Thickening properties and emulsification mechanisms of new derivatives of polysaccharides in aqueous solution", Journal of Colloid and Interface Science, 282(2), (2005), 448-457.

Kawakami, K., et al., "Salt Tolerance of an Aqueous Solution of a Novel Amphiphilic Polysaccharide Derivative", Langmuir, 22(7), (2006), 3337-3343.

* cited by examiner

HYDROPHOBICALLY AND HYDROPHILICALLY MODIFIED POLYSACCHARIDES AND METHODS OF USING THE SAME FOR TREATMENT OF A SUBTERRANEAN FORMATION

PRIORITY APPLICATIONS

This application is a U.S. National Stage Filing under 35 U.S.C. 371 from International Application No. PCT/US2013/055373, filed on Aug. 16, 2013; and published as WO 2015/023296 on Feb. 19, 2015; which application and publication are incorporated herein by reference in their entirety.

BACKGROUND OF THE INVENTION

During the drilling, stimulation, completion, and production phases of wells for petroleum or water extraction, the downhole use of compositions having high viscosities is important for a wide variety of purposes. Higher viscosity fluids can more effectively carry materials to a desired location downhole, such as proppants. Similarly, higher viscosity drilling fluids can more effectively carry materials away from a drilling location downhole. The use of higher viscosity fluids during hydraulic fracturing generally results in larger more dominant fractures.

One common way to attain high viscosities in drilling fluids is to use a mixture of water and a viscosifier, such as guar gum. However, typically viscosifiers must be added in high concentrations to provide viscosities sufficient to suspend a desired proppant, which can result in high transportation costs and low efficiency preparation of viscous materials. Viscosifiers are frequently prone to uneven wetting, forming lumps or "fish eyes" during mixing with liquids, which can damage subterranean formations and can require longer mixing times or more sophisticated mixing equipment. Viscosifiers generally unevenly viscosify liquids of different polarities, forming mixtures with inhomogenous and relative unpredictable or variable properties in solutions with multiple liquids.

In addition, the presence of certain ions in water can limit, reduce, or degrade the viscosity of certain viscosifiers. This limits the use of certain ion-containing water, such as sea water, or water recovered from or naturally produced by some subterranean formations. As a result, the oil and gas industry spends substantial amounts of money and energy to obtain fresh water used for drilling fluid applications, such as for fracturing fluid, or avoids formations having substantial concentrations of particular ions, shrinking the value and size of the market and reducing the number of customers to whom fracturing services can be provided.

SUMMARY OF THE INVENTION

In various embodiments, the present invention provides a method of treating a subterranean formation. The method includes obtaining or providing a composition that includes a hydrophobically and hydrophilically modified polysaccharide (HHMP). The method includes placing the composition in a subterranean formation.

In various embodiments, the present invention provides a method of treating a subterranean formation. The method includes obtaining or providing a composition including a hydrophobically and hydrophilically modified polysaccharide (HHMP). The HHMP includes a monosaccharide repeating unit having the structure

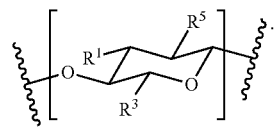

The variable $R^1$=—OH, $R^5$=—O—$(C_1$-$C_5)$alkyl-OH, and $R^3$=—$(C_1$-$C_5)$alkyl-O—$(C_1$-$C_5)$alkyl-O—$R^6$. At each occurrence $R^6$ is independently selected from —H, —PG, and —NPG. At each occurrence hydrophilic group PG is independently -L-$(C_0$-$C_{10})$alkyl-A. At each occurrence A is independently selected from the group consisting of —C(O)O$^-$CI$^+$, —S(O)(O)O$^-$CI$^+$, and —P(O)(O)(O$^-$CI$^+$)(O$^-$R$^+$). At each occurrence CI$^+$ is independently a counterion. At each occurrence R$^+$ is independently selected from the group consisting of H$^+$ and CI$^+$. At each occurrence CI$^+$ is selected from the group consisting of Na$^+$, K$^+$, Li$^+$, Zn$^+$, and NH$_4^+$. At each occurrence L is independently selected from the group consisting of $(C_1$-$C_5)$alkyl substituted with 0, 1, 2, or 3 —OH and interrupted or terminated by 0, 1, 2, or 3 oxygen atoms, and —[R$^9$]$_n$—. At each occurrence R$^9$ is independently $(C_1$-$C_5)$alkyl substituted with 0, 1, 2, or 3 —OH, interrupted or terminated by 0, 1, 2, or 3 oxygen atoms, and at each occurrence n is independently about 2 to about 5. The HHMP has about 0.000,01 to about 0.999,99 PG groups per monosaccharide unit and the HHMP has about 0.000,01 to about 0.999,99 NPG groups per monosaccharide unit. The method also includes placing the composition in a subterranean formation.

In various embodiments, the present invention provides a system. The system includes a composition comprising a hydrophobically and hydrophilically modified polysaccharide (HHMP). The system also include a subterranean formation including the composition therein.

In various embodiments, the present invention provides a composition for treatment of a subterranean formation. The composition includes a hydrophobically and hydrophilically modified polysaccharide (HHMP). In some embodiments, the HHMP includes, in a random or block copolymer arrangement, the structure

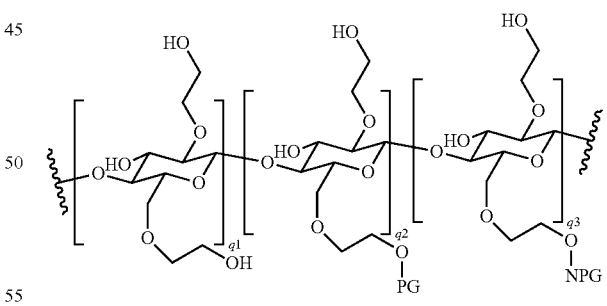

At each occurrence hydrophilic group PG is independently -L-$(C_0$-$C_{10})$alkyl-A. At each occurrence A is independently selected from the group consisting of —C(O)O$^-$CI$^+$, —S(O)(O)O$^-$CI$^+$, and —P(O)(O)(O$^-$CI$^+$)(O$^-$R$^+$). At each occurrence CI$^+$ is independently a counterion. At each occurrence R$^+$ is independently selected from the group consisting of H$^+$ and CI$^+$. At each occurrence CI$^+$ is selected from the group consisting of Na$^+$, K$^+$, Li$^+$, Zn$^+$, and NH$_4^+$. At each occurrence L is independently selected from the group consisting of $(C_1$-$C_5)$alkyl substituted with 0, 1, 2, or 3 —OH and interrupted or terminated by 0, 1, 2, or 3 oxygen atoms, and —[$R^9$]$_n$—. At each occurrence $R^9$ is independently ($C_1$-$C_5$) alkyl substituted with 0, 1, 2, or 3 —OH, interrupted or terminated by 0, 1, 2, or 3 oxygen atoms, and at each occurrence n is independently about 2 to about 5. At each occurrence hydrophobic group NPG is independently -L-($C_{10}$-$C_{50}$)alkyl. The quantity q2/(q1+q2+q3) is about 0.05-0.60, and q3/(q1+q2+q3) is about 0.0015 to about 0.0090.

In various embodiments, the present invention provides a method of preparing a composition for treatment of a subterranean formation. The method includes forming a composition that includes a hydrophobically and hydrophilically modified polysaccharide (HHMP).

Various embodiments of the present invention provide certain advantages over other viscosifiers and methods of using the same, at least some of which are unexpected. For example, in some embodiments, the HHMP can provide a greater increase in viscosity of a downhole fluid per mass than other viscosifiers. In some embodiments, compared to the viscosity of a downhole fluid having a given concentration of a viscosifier, a corresponding downhole fluid having the same or lower concentration of the HHMP can have a higher viscosity. In some embodiments, by enabling a higher viscosity with the use of less viscosifier, the HHMP can provide lower transportation costs and shorter preparation time, making operations more efficient overall. In some embodiments, the HHMP can have better wetting than other viscosifiers, and can be more easily blended with a variety of downhole fluids with less or substantially no formation of lumps at a given shear rate of mixing, reducing preparation cost and time. In some embodiments, the HHMP can provide viscosification over a broader variety of solvents and liquids than other viscosifying agents, providing greater versatility. In various embodiments, the HHMP can provide more even and predictable viscosities across different liquids in a mixture of multiple liquids, and can provide a mixture having more homogenous viscosity and better performance during transport to the subterranean formation and during subsequent use downhole.

Many conventional viscosifiers suffer ill-effects when used with liquids such as water having certain ions present at particular concentrations, for example a decrease in the degree of hydration or hydratability, a decrease in the degree of crosslinking or crosslinkability, a decrease in viscosity, or gel contraction. For example, many viscosifiers suffer negative effects when used with liquids having certain amounts of iron ions present, or certain amounts of sodium chloride dissolved therein. In some embodiments, the HHMP can be used with liquids having ions dissolved therein and can suffer less or no negative effects from the ions, as compared to conventional methods and compositions for downhole use, such as at least one of less or no decrease in degree of hydration or hydratability, less or no decrease in degree of crosslinking or crosslinkability, less or no decrease in viscosity, and less or no increase in gel contraction (e.g. less or no shrinkage). In some embodiments, the methods and compositions of the present invention can be used with water having a greater concentration of particular ions dissolved therein and can suffer less or no negative effects from the ions as compared to conventional methods and compositions. In some embodiments, the HHMP of the present invention can be used with greater amounts of sodium chloride dissolved therein or iron ions therein, and can suffer less or no negative effects from the ions, as compared to conventional methods and compositions. By being able to retain various beneficial properties in the presence of ions, or in the presence of larger amounts of particular ions, than other methods and compositions, various embodiments can avoid the need for ion-free or ion-depleted water, or can avoid a need to add greater amounts of viscosifier to achieve a desired effect downhole, and can thereby be more versatile, more cost effective, or more efficient than other methods and compositions for downhole use.

In some embodiments, the HHMP of the present invention can simplify processing and formulation of downhole fluids by providing a self-gelling and highly salt-tolerant gellant and friction reducer. In various embodiments, the HHMP can reduce the need for or make obsolete traditional additives such as thickeners, friction reducers, metallic crosslinkers, and correspondingly reduce or eliminate the traditional process of ensuring that all the additives are compatible with one another and can coexist stably in various conditions. In various embodiments, the HHMP can be regarded as a more robust gellant and friction reducer, tolerating a wider variety of ambient conditions with less adjustment to the composition of a downhole fluid including the HHMP needed to achieve a desired effect.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Figure 1:
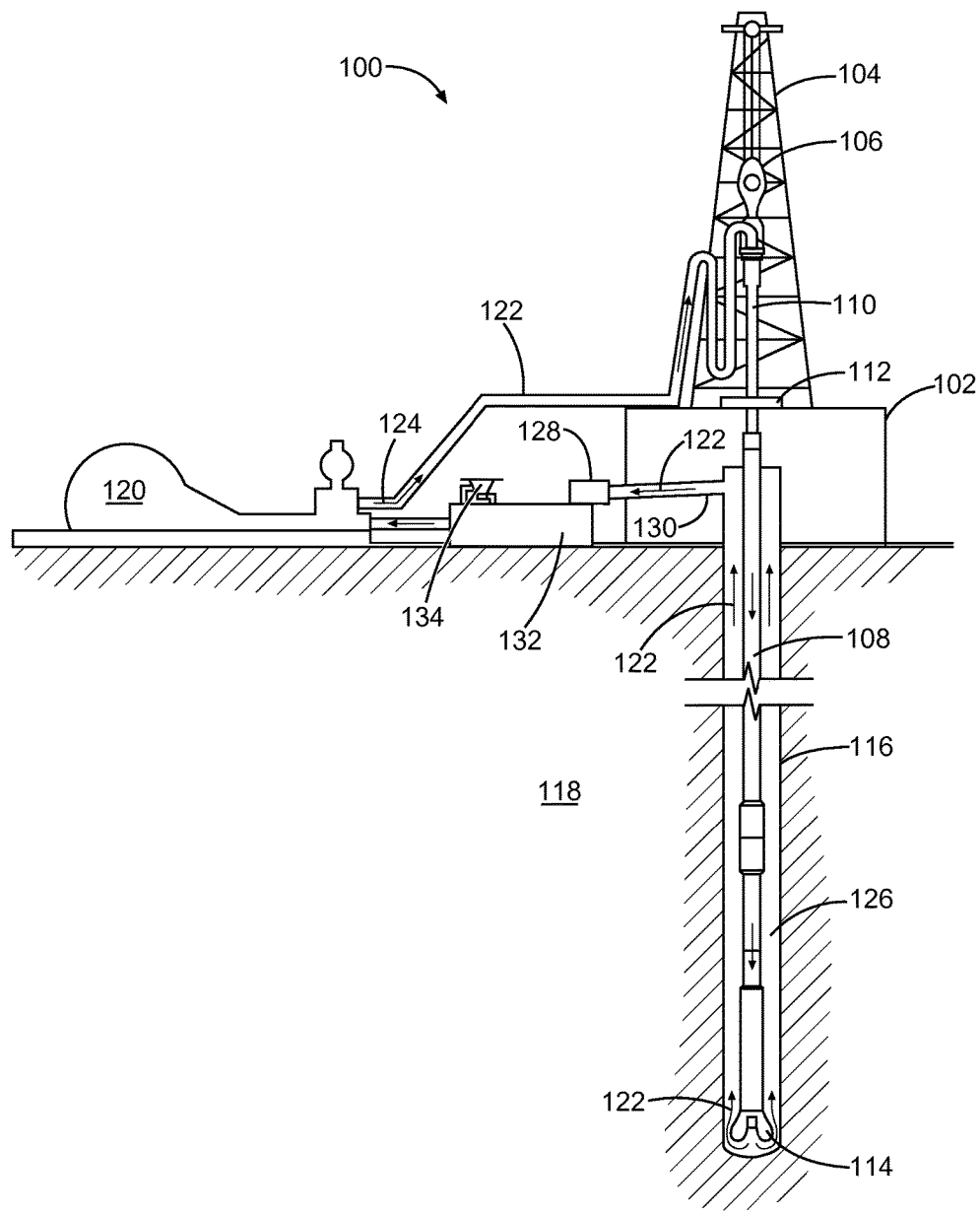
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as alkoxy groups, aryloxy groups, aralkyloxy groups, oxo(carbonyl) groups, carboxyl groups including carboxylic acids, carboxylates, and carboxylate esters; a sulfur-containing group such as alkyl and aryl sulfide groups; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S) N(R)$_2$, (CH$_2$)$_{0-2}$N(R)C(O)R, (CH$_2$)$_{0-2}$N(R)N(R)$_2$, N(R)N (R)C(O)R, N(R)N(R)C(O)OR, N(R)N(R)CON(R)$_2$, N(R) SO$_2$R, N(R)SO$_2$N(R)$_2$, N(R)C(O)OR, N(R)C(O)R, N(R)C (S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule, or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N (R)C(O)R, (CH$_2$)$_{0-2}$N(R)N(R)$_2$, N(R)N(R)C(O)R, N(R)N (R)C(O)OR, N(R)N(R)CON(R)$_2$, N(R)SO$_2$R, N(R)SO$_2$N (R)$_2$, N(R)C(O)OR, N(R)C(O)R, N(R)C(S)R, N(R)C(O)N (R)$_2$, N(R)C(S)N(R)$_2$, N(COR)COR, N(OR)R, C(=NH)N (R)$_2$, C(O)N(OR)R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH (CH$_3$), —CH=C(CH$_3$)$_2$, —C(CH$_3$)=CH$_2$, —C(CH$_3$) =CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) group is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-, 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structures are substituted therewith.

The terms "halo" or "halogen" or "halide", as used herein, by themselves or as part of another substituent mean, unless otherwise stated, a fluorine, chlorine, bromine, or iodine atom, preferably, fluorine, chlorine, or bromine.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

As used herein, "degree of polymerization" is the number of repeating units in a polymer.

As used herein, the term "polymer" refers to a molecule having at least one repeating unit, and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid, or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments, or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore; placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein "treatment of a subterranean formation" can include any activity directed to extraction of water or petroleum materials from a subterranean petroleum- or water-producing formation or region, for example, including drilling, stimulation, hydraulic fracturing, clean-up, acidization, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore, or vice-versa. A flow pathway can include at least one of a hydraulic fracture, a fluid connection across a screen, gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

Method of Treating a Subterranean Formation.

In some embodiments, the present invention provides a method of treating a subterranean formation. The method can be a method of at least one of hydraulic fracturing, drilling, and gravel placement. The method includes obtaining or providing a composition including a hydrophobically and hydrophilically modified polysaccharide (HHMP). The obtaining or providing of the composition can occur at any suitable time and at any suitable location. The obtaining or providing of the composition can occur above the surface. The obtaining or providing of the composition can occur downhole. The method also includes placing the composition in a subterranean formation. The placing of the composition in the subterranean formation can include contacting the composition and any suitable part of the subterranean formation, or contacting the composition and a subterranean material downhole, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing, and can include any suitable contacting between the subterranean formation and the composition, wherein the HHMP can contact the subterranean formation in any suitable way, such as in a dissolved solution, a heterogeneous mixture, an emulsion, or as a slurry. The placing of the composition in the subterranean formation can include at least partially depositing the composition in a fracture, flow pathway, or an area surrounding the same.

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another, for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter) or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidization, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

In some embodiments, the composition includes a proppant or gravel, or the composition is mixed with a proppant or gravel to form a mixture. The composition can be mixed with proppant or gravel, or have proppant or gravel added thereto, at least one of above the surface or downhole. In some embodiments, the placing of the composition in the subterranean formation includes placing the mixture in the subterranean formation. The proppant or gravel can be any suitable proppant or gravel. For example, the proppant can be at least one of sand, gravel, bauxite, ceramic materials, glass materials, polymer materials, tetrafluoroethylene materials, nut shell materials, seed shell materials, fruit pit materials, wood, processed wood, hollow glass microspheres, and solid glass. A mixture of proppant or gravel and the composition can have any suitable amount of proppant or gravel therein, such as about 0.001 wt % to about 99.999 wt % of the mixture, 50 wt % to about 98 wt % of the mixture, or about 0.001 wt % or less, or about 0.01, 0.1, 1, 2, 3, 4, 5, 10, 15, 20, 25, 30, 35, 40, 45, 50, 60, 70, 80, 90, 91, 92, 93, 94, 95, 96, 97, 98, 99, 99.9, 99.99, or about 99.999 wt % of the mixture or more.

The composition can have any suitable viscosity above the surface and downhole. In various embodiments, the viscosity above the surface is sufficient to allow suspension of a desired proppant and transport of the suspension to a desired location downhole, and the viscosity below the surface is sufficient to provide for effective transfer of force to the subterranean formation for use as a fracturing fluid, to place gravel in a suitable location downhole, or to thicken a drilling fluid such that it efficiently carries tailings and other matter to the surface from a drill head. In various embodiments, the composition can be crosslinked downhole to increase the viscosity. In some embodiments, the composition can have a viscosity at standard temperature and pressure or under downhole conditions of about 0.01 cP to about 15,000 cP, or about 0.02 cP to about 1,500 cP, or about 0.01 cP or less, or about 0.02, 0.05, 0.1, 0.5, 1, 2, 3, 4, 5, 10, 25, 50, 75, 100, 150, 200, 250, 500, 750, 1000, 1,250, 1,500, 1,750, 2,000, 3,000, 4,000, 5,000, 6,000, 7,000, 8,000, 9,000, 10,000, 11,000, 12,000, 13,000, 14,000, or about 15,000 cP or more. In some embodiments, the composition can have a viscosity under downhole conditions of at least 50 cP, or about 100 cP to about 1,000,000,000 cP, or about 50 cP or less, or about 75 cP, 100, 250, 500, 1000, 1,500, 2,000, 2,500, 5,000, 7,500, 10,000, 15,000, 25,000, 50,000, 75,000, 100,000, 200,000, 500,000, 750,000, 1,000,000, 2,500,000, 5,000,000, 10,000,000, 50,000,000, 100,000,000, 500,000,000, or about 1,000,000,000 or more (e.g. the composition can have a substantially infinite viscosity). The downhole conditions can be any suitable downhole conditions. For example, the downhole conditions in the location in the subterranean formation where the composition is placed can include a temperature of about −20° C. to about 600° C., or about 0° C. to about 300° C., or about −20° C. or less, or about −10, 0, 10, 20, 30, 40, 50, 60, 70, 80, 90, 100, 125, 150, 175, 200, 225, 250, 275, 300, 325, 350, 375, 400, 425, 450, 475, 500, 550, or about 600° C. or more.

The HHMP can provide any suitable degree of viscosity increase per mass of HHMP or per concentration unit of HHMP in the composition. For example, as compared to a corresponding composition not having the HHMP therein, the composition having HHMP can have a viscosity that is about 1 cP to about 1,000,000 cP greater, or about 10 cP to about 100,000 cP greater, or about 1 cP or less greater, or about 5 cP, 10, 20, 50, 100, 250, 500, 750, 1,000, 2,500, 5,000, 10,000, 25,000, 50,000, 75,000, 100,000, 150,000, 200,000, 300,000, 400,000, 500,000, 600,000, 700,000, 800,000, 900,000, or about 1,000,000 cP or more greater for every about 0.1 wt % to about 10 wt % of the HHMP in the composition, or per every about 1 wt % to about 5 wt %, or for every about 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, or for every about 10 wt % of the HHMP in the composition.

The composition including the HHMP can have any suitable yield strength, where as used herein yield stress refers to the amount of shear stress needed to cause the composition to undergo plastic deformation or yield, wherein yielding occurs when the applied shear stress exceeds the yield strength. For example, in various embodiments, at room temperature or under conditions downhole the composition including the HHMP can have yield strength of about 0.01 Pa to about 100,000 Pa, or about 1 Pa to about 10,000 Pa, or about 0.01 Pa or less, or about 0.05 Pa, 1, 2, 3, 4, 5, 10, 15, 20, 25, 50, 75, 100, 150, 200, 250, 500, 750, 1,000, 1,500, 2,000, 2,500, 5,000, 7,500, 10,000, 15,000, 20,000, 25,000, 50,000, 75,000, or about 100,000 Pa or more. The composition including the HHMP can have any suitable static gel strength, wherein as used herein static gel strength refers to the yield stress of the composition after the composition has been undisturbed for a period of time, such as 1 s, 5 s, 10 s, 20 s, 30 s, 40 s, 50 s, 60 s, 1.5 m, 2 m, 3 m, 4 m, 5 m, 6 m, 7 m, 8 m, 9 m, 10 m, 15 m, 20 m, 30 m, 40 m, 50 m, 60 m, 1.5 h, 2 h, 3 h, 4 h, 5 h, 10 h, 15 h, 20 h, 1 d, 1.5 d, 2 d or more. The static gel strength can be determined while substantially no agitation occurs within or around the composition, such as substantially no agitation adjacent to a surface contacting the composition, for a suitable period of time. For example, the composition can have a static gel strength of about 0.01 Pa to about 100,000 Pa, or about 1 Pa to about 10,000 Pa, or about 0.01 Pa or less, or about 0.05 Pa, 1, 2, 3, 4, 5, 10, 15, 20, 25, 50, 75, 100, 150, 200, 250, 500, 750, 1,000, 1,500, 2,000, 2,500, 5,000, 7,500, 10,000, 15,000, 20,000, 25,000, 50,000, 75,000, or about 100,000 Pa or more.

In some embodiments, the HHMP can be substantially evenly wetted within the composition, wherein as used herein wettability refers to the ability of a solid to attain and maintain contact with a liquid surface. The wettability can be sufficient to avoid formation of lumps as the HHMP is mixed to form the composition. In other embodiments, some uneven wetting or lump formation can occur, such as with inadequate shear application during mixing. In some embodiments, the composition including the HHMP can have any suitable degree of variation in viscosity throughout the composition, and can have substantially homogenous viscosity throughout. For example, in various embodiments, at standard temperature and pressure or under downhole conditions a variation in viscosity between two liquids in the composition can be no more than about 500 cP, or about 0.000,001 cP to about 100 cP, or about 0.000,001 cP or less, or about 0.000,01 cP, 0.000,1, 0.001, 0.01, 0.1, 1, 2, 3, 4, 5, 10, 15, 20, 25, 50, 75, 100, 150, 200, 250, 300, 350, 400, 450, 500, 1,000, 5,000, or about 10,000, or more.

In various embodiments, the composition can include a liquid carrier phase. The carrier phase can be any suitable liquid or more than one liquid. For example, the composition comprises at least one of brine, brackish water, seawater, water from a subterranean formation, water recovered from a subterranean formation, a non-aqueous liquid, an oil, an organic solvent, a downhole fluid, and an alcohol. The composition can include at least one salt chosen from calcium chloride, sodium chloride, potassium chloride, magnesium chloride, calcium bromide, sodium bromide, potassium bromide, calcium nitrate, sodium formate, potassium formate, and cesium formate. The salt or multiple salts can be present in any suitable concentration, such as about 0.000,000,001 wt % to about 30 wt %, or about 0.000,1 wt % to about 30 wt %, or about 0.000,000,001 wt % or less, or about 0.000,000,01, 0.000,000,1, 0.000,001, 0.000,01, 0.000,1, 0.001, 0.01, 0.1, 1, 2, 3, 4, 5, 10, 15, 20, 25, 30, 40, or about 50 wt % or more. In some embodiments, the composition includes at least one ion such as an organic ion or an inorganic ion. The ion can be any suitable ion, such as fluoride, chloride, bromide, iodide, nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate, acetate, formate, oxide, sulfide, nitride, arsenate, phosphate, arsenite, hydrogen phosphate, sulfate, thiosulfate, sulfite, carbonate, chromate, dichromate, peroxide, or oxalate. In some examples, the ion is a cation selected from $Na^+$, $K^+$, $Ag^+$, $NH_4^+$, $Al^{3+}$, $Ca^{2+}$, $Cu^{2+}$, $Fe^{2+}$, $Fe^{3+}$, and $Mg^{2+}$. For example, the ion can be $Fe^{2+}$ or $Fe^{3+}$. The composition can include any suitable amount of the ion or multiple ions, such as about 0.000,000,001 wt % to about 30 wt % of the ion, about 0.000,1 wt % to about 30 wt %, or about 0.000,000,001 wt % or less, or about 0.000,000,01, 0.000,000,1, 0.000,001, 0.000,01, 0.000,1, 0.001, 0.01, 0.1, 1, 2, 3, 4, 5, 10, 15, 20, 25, 30, 40, or about 50 wt % or more of the ion.

In various embodiments, the composition can include a crosslinker. The crosslinker can be any suitable crosslinker. For example, the crosslinker can be a compound including at least one of chromium, aluminum, antimony, zirconium, titanium, calcium, boron, iron, silicon, copper, zinc, magnesium, and an ion thereof. Examples of suitable crosslinkers include boric acid, borax, a borate, a $(C_1-C_{30})$ hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, and aluminum citrate.

In some embodiments, the HHMP in the composition can be crosslinked. The HHMP can be crosslinked before the performance of the method. The HHMP can be crosslinked during the method. The HHMP can be crosslinked before the method, and further crosslinked during the method. The HHMP can be crosslinked above the surface, downhole, or a combination thereof. The HHMP can be crosslinked in any suitable fashion. The HHMP can be crosslinked to other HHMP molecules, to other molecules such as other gel molecules, or both.

In some embodiments, the composition can include a gel or crosslinked gel, such as a gel or crosslinked gel in addition to the HHMP, such as one or more gels or crosslinked gels. For example, the gel or crosslinked gel can be at least one of a linear polysaccharide and a poly($(C_2-C_{10})$alkenylene), wherein the $(C_2-C_{10})$alkenylene is substituted or unsubstituted. The gel or crosslinked gel can be poly (acrylic acid) or $(C_1-C_5)$alkyl esters thereof, poly(methacrylic acid) or $(C_1-C_5)$alkyl esters thereof, poly(vinyl acetate), poly(vinyl alcohol), poly(ethylene glycol), poly (vinyl pyrrolidone), polyacrylamide, poly(hydroxyethyl methacrylate), acetan, alginate, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, derivatized guar, gum ghatti, gum arabic, locust bean gum, cellulose, and derivatized cellulose. The gel or crosslinked gel can include cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

Hydrophobically and Hydrophilically Modified Polysaccharide (HHMP).

The composition includes at least one HHMP. The composition can include one HHMP or multiple HHMPs. The HHMP can be any suitable HHMP. The modification of the polysaccharide to generate the HHMP can occur before the composition is provided or obtained, before the method is practiced, or during the providing or obtaining of the composition or the practicing of the method. In some embodiments, the method can include a step of hydrophobically or hydrophilically modifying a polysaccharide; in other embodiments, a polysaccharide is already hydrophobically or hydrophilically modified and is a HHMP prior to the beginning of the method.

The one or more HHMPs can have any suitable concentration within the composition, such that the composition can be used as described herein. In some embodiments, the composition can have about 0.000,000,1 wt % to about 50 wt % of the one or more HHMPs, or about 0.001 wt % to about 50 wt %, or about 0.000,000,1 wt %, or about 0.000,001, 0.000,01, 0.000,1, 0.001, 0.01, 0.1, 0.2, 0.3, 0.4, 0.5, 0.6, 0.7, 0.8, 0.9, 1, 1.2, 1.4, 1.6, 1.8, 2, 2.2, 2.4, 2.6, 2.8, 3, 3.5, 4, 4.5, 5, 6, 7, 8, 9, 10, 15, 20, 25, 30, 35, 40, 45, 50, 55, 60, 65, 70, 75, 80, 85, 90, 95, 96, 97, 98, 99, 99.9, 99.99, 99.999, 99.999,9, 99.999,99, 99.999,999, or about 99.999, 999,9 wt % or more.

The HHMP can be any suitable polysaccharide. For example, the HHMP can be a linear polysaccharide, wherein the polysaccharide backbone of the compound is linear. The HHMP can be a polysaccharide such as at least one of acetan, alginate, alginic acid, cellulose, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, and a derivative thereof having —O—$(R^9)_n$—OH groups in place of —OH groups, wherein at each occurrence $R^9$ is independently substituted or unsubstituted $(C_1-C_{20})$hydrocarbylene interrupted or terminated by 0, 1, 2, or 3 of at least one of O, S, and substituted or unsubstituted N and at each occurrence n is independently about 2 to about 2,000.

The HHMP can have any suitable molecular weight. For example, the HHMP can have molecular weight of about 500 g/mol to about 100,000,000 g/mol, about 1,000 g/mol to about 5,000,000 g/mol, or about 1,000,000 g/mol, to about 2,000,000 g/mol, or about 500 g/mol or less, or about 1,000 g/mol, 5,000, 10,000, 25,000, 50,000, 75,000, 100,000, 150,000, 200,000, 500,000, 750,000, 1,000,000, 1,250,000, 1,500,000, 1,750,000, 2,000,000, 3,000,000, 4,000,000, 5,000,000, 10,000,000, 50,000,000, or about 100,000,000 or more.

The hydrophilic modification of the HHMP can be any suitable hydrophilic modification that includes at least one hydrophilic group on the HHMP. For example, the hydrophilic modification can include at least one —O—PG group on the HHMP, wherein PG is a hydrophilic group (e.g., "polar group"). The —O—PG group can be a —OH group before the hydrophilic modification. The HHMP can have any suitable number of PG groups per monosaccharide unit. In some embodiments, the HHMP can have about 0.000,01 to about 0.999,99 PG groups per monosaccharide unit, about 0.05 to about 0.60, or about 0.11 to about 0.45 PG groups per monosaccharide unit, or about 0.000,01 or less, or about 0.000,05, 0.000,1, 0.000,5, 0.001, 0.005, 0.01, 0.05, 0.1, 0.15, 0.2, 0.25, 0.3, 0.35, 0.4, 0.45, 0.5, 0.55, 0.6, 0.65, 0.7, 0.8, 0.9, 0.95, 0.99, 0.995, 0.999, 0.999,5, 0.999,9, 0.999,95, or about 0.999,99 or more PG groups per monosaccharide unit.

The hydrophilic PG group can be any suitable hydrophilic group with any suitable degree of hydrophilicity, such that the HHPG has properties allowing it to be used as described herein. For example, at each occurrence PG can be independently selected from the group consisting of —$(C_0-C_{50})$hydrocarbyl-A and -L-$(C_0-C_{50})$hydrocarbyl-A, wherein hydrocarbyl is substituted or unsubstituted. At each occurrence L can be independently selected from the group consisting of substituted or unsubstituted $(C_1-C_{50})$hydrocarbyl interrupted or terminated by 0, 1, 2, or 3 of at least one of O, S, and substituted or unsubstituted N, and —$[R^9]_n$—. At each occurrence $R^9$ can be independently substituted or unsubstituted $(C_1-C_{20})$hydrocarbylene interrupted or terminated by 0, 1, 2, or 3 of at least one of O, S, and substituted or unsubstituted N and at each occurrence n is independently about 2 to about 2,000. At each occurrence A can be independently selected from the group consisting of —C(O)$O^-CI^+$, —S(O)(O)$O^-CI^+$, and —P(O)(O)($O^-CI^+$)($O^-R^+$). At each occurrence $CI^+$ can be independently a counterion. At each occurrence $R^+$ can be independently selected from the group consisting of $H^+$ and $CI^+$. In some examples, PG can be -L-$(C_0-C_{10})$alkyl-A. The PG group can be —$(C_1-C_5)$ alkyl-A, wherein alkyl is substituted with 0, 1, 2, or 3 —OH groups. The PG group can be

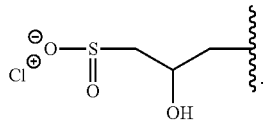

The hydrophobic modification of the HHMP can be any suitable hydrophobic modification that includes at least one hydrophobic group on the HHMP. For example, the hydrophobic modification can include at least one —O—NPG group on the HHMP, wherein NPG is a hydrophobic group (e.g., "non-polar group"). The —O—NPG or group can be an —OH group before the hydrophobic modification. The HHMP can have any suitable number of NPG groups per monosaccharide unit. In some embodiments, the HHMP can have about 0.000,01 to about 0.999,99 NPG groups per monosaccharide unit, about 0.0015 to about 0.0090, or about 0.0033 to about 0.0064 NPG groups per monosaccharide unit, or about 0.000,01 or less, or about 0.000,05, 0.000,1, 0.000,5, 0.001, 0.002, 0.002,5, 0.003, 0.003,5, 0.004, 0.004, 5, 0.005, 0.005,5, 0.006, 0.006,5, 0.007, 0.007,5, 0.008, 0.008,5, 0.009, 0.01, 0.05, 0.1, 0.15, 0.2, 0.25, 0.3, 0.35, 0.4, 0.45, 0.5, 0.55, 0.6, 0.65, 0.7, 0.8, 0.9, 0.95, 0.99, 0.995, 0.999, 0.999,5, 0.999,9, 0.999,95, or about 0.999,99 or more NPG groups per monosaccharide unit.

The hydrophobic PG can be any suitable hydrophobic group with any suitable degree of hydrophobicity, such that the HHPG has properties allowing it to be used as described herein. For example, at each occurrence NPG can be independently selected from the group consisting of —$R^{11}$ and -L-$R^{11}$. At each occurrence $R^{11}$ can be independently substituted or unsubstituted —$(C_3-C_{50})$hydrocarbyl interrupted or terminated by 0, 1, 2, or 3 of at least one of O, S, and substituted or unsubstituted N. At each occurrence L can be independently selected from the group consisting of substituted or unsubstituted $(C_1-C_{50})$hydrocarbyl interrupted or terminated by 0, 1, 2, or 3 of at least one of O, S, and substituted or unsubstituted N, and —$[R^9]_n$—. At each occurrence $R^9$ can be independently substituted or unsubstituted $(C_1-C_{20})$hydrocarbylene interrupted or terminated by 0, 1, 2, or 3 of at least one of O, S, and substituted or unsubstituted N and at each occurrence n is independently about 2 to about 2,000. In some examples, NPG can be -L-$(C_{10}-C_{50})$alkyl. The NPG group can be —$(C_1-C_5)$alkyl- O—$(C_{10}$-$C_{50})$alkyl, wherein $(C_1$-$C_5)$alkyl is substituted with 0, 1, 2, or 3 —OH groups. In some embodiments, NPG is

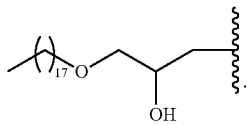

In some embodiments, the HHMP can include a monosaccharide repeating unit having the structure

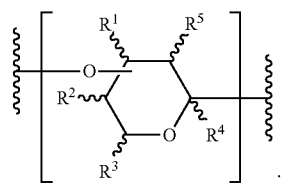

At each occurrence each of $R^1$, $R^2$, $R^3$, $R^4$, and $R^5$ can be independently selected from the group consisting of —$R^7$ and —$OR^7$. At each occurrence $R^7$ can be independently selected from the group consisting of —H and -L-$R^8$. At each occurrence $R^8$ can be independently selected from the group consisting of —$R^6$ and —$OR^6$. At each occurrence $R^6$ can be independently selected from —H, —PG, and —NPG, wherein at each occurrence PG is independently a hydrophilic group and at each occurrence NPG is independently a hydrophobic group as described herein. At each occurrence L can be independently selected from the group consisting of substituted or unsubstituted $(C_1$-$C_{50})$hydrocarbyl interrupted or terminated by 0, 1, 2, or 3 of at least one of O, S, and substituted or unsubstituted N, and —$[R^9]_n$—. At each occurrence $R^9$ can be independently substituted or unsubstituted $(C_1$-$C_{20})$hydrocarbylene interrupted or terminated by 0, 1, 2, or 3 of at least one of O, S, and substituted or unsubstituted N and at each occurrence n is independently about 2 to about 2,000. The polysaccharide has at least one PG group and at least one NPG group.

In some embodiments, at each occurrence L is independently selected from the group consisting of substituted or unsubstituted $(C_1$-$C_{10})$alkyl interrupted or terminated by 0, 1, 2, or 3 oxygen atoms, and —$[R^9]_n$—. At each occurrence $R^9$ can be independently substituted or unsubstituted $(C_1$-$C_{10})$alkyl interrupted or terminated by 0, 1, 2, or 3 O. At each occurrence n can be independently about 2 to about 20. In some embodiments, L can be independently selected from the group consisting of $(C_1$-$C_5)$alkyl substituted with 0, 1, 2, or 3 —OH and interrupted or terminated by 0, 1, 2, or 3 oxygen atoms, and —$[R^9]_n$—. At each occurrence $R^9$ can be independently $(C_1$-$C_5)$alkyl substituted with 0, 1, 2, or 3 —OH, interrupted or terminated by 0, 1, 2, or 3 O. At each occurrence n can be independently about 2 to about 5. In some embodiments, $R^2$=$R^4$=—H, $R^1$=—OH, $R^5$=—O—$(C_1$-$C_5)$alkyl-OH, and $R^3$=—$(C_1$-$C_5)$alkyl-O—$(C_1$-$C_5)$alkyl-O—$R^6$. In some embodiments, $R^2$=$R^4$=—H, $R^1$=—OH, $R^5$=—O-ethyl-OH, and $R^3$=-methyl-O-ethyl-O—$R^6$.

In some embodiments, the HHMP can have the structure

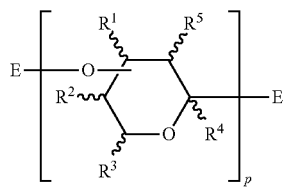

The endcapping or terminal unit of the polysaccharide E can be any suitable unit as known in the art or as disclosed herein. For example, E can be independently at each occurrence selected from the group consisting of —H, —$R^7$, and —$OR^7$, and p can be any suitable degree of polymerization, such as about 100 to about 50,000, 1,000 to about 20,000, or about 1,000 or less, or about 2,000, 3,000, 4,000, 5,000, 6,000, 7,000, 8,000, 9,000, 10,000, 11,000, 12,000, 13,000, 14,000, 15,000, 16,000, 17,000, 18,000, 19,000, or about 20,000, or more.

In some embodiments, the HHMP can include a monosaccharide repeating unit having the structure

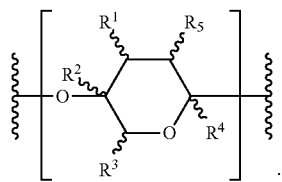

In some embodiments, the HHMP can include a monosaccharide repeating unit having the structure

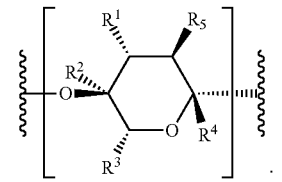

In various embodiments, the HHMP includes a monosaccharide repeating unit having the structure

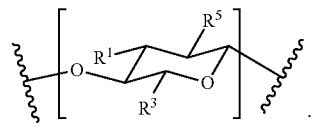

In various embodiments, the HHMP includes a monosaccharide repeating unit having the structure

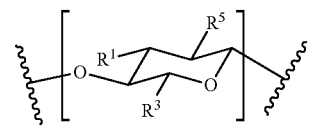

The variable $R^1$=—OH, $R^5$=—O—$(C_1$-$C_5)$alkyl-OH, and $R^3$=—$(C_1$-$C_5)$alkyl-O—$(C_1$-$C_5)$alkyl-O—$R^6$. At each occurrence $R^6$ can be independently selected from —H, —PG, and —NPG. At each occurrence hydrophilic group PG can be independently -L-$(C_0$-$C_{10})$alkyl-A. At each occurrence A can be independently selected from the group consisting of —C(O)O$^-$CI$^+$, —S(O)(O)O$^-$CI$^+$, and —P(O)(O)(O$^-$CI$^+$)(O$^-$R$^+$). At each occurrence CI$^+$ can be independently a counterion, and wherein at each occurrence R$^+$ is independently selected from the group consisting of H$^+$ and CI$^+$. At each occurrence C can be selected from the group consisting of Na$^+$, K$^+$, Li$^+$, Zn$^+$, and NH$_4^+$. At each occurrence L can be independently selected from the group consisting of $(C_1$-$C_5)$alkyl substituted with 0, 1, 2, or 3 —OH and interrupted or terminated by 0, 1, 2, or 3 oxygen atoms, and —[R$^9]_n$— wherein at each occurrence R$^9$ is independently $(C_1$-$C_5)$alkyl substituted with 0, 1, 2, or 3

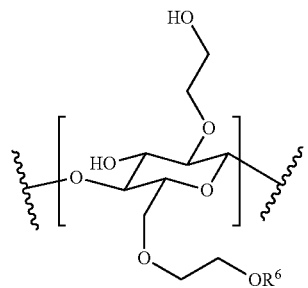

In some embodiments, the HHMP includes, in a random or block copolymer arrangement, the structure

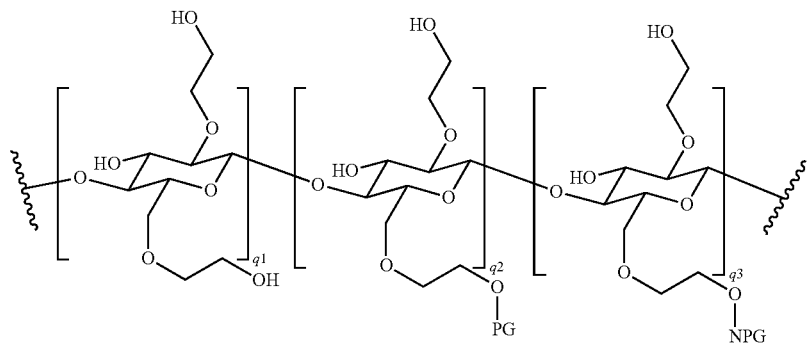

—OH, interrupted or terminated by 0, 1, 2, or 3 O. At each occurrence n can be independently about 2 to about 5. The HHMP can have about 0.000,01 to about 0.999,99 PG groups per monosaccharide unit and the HHMP can have about 0.000,01 to about 0.999,99 NPG groups per monosaccharide unit. In some embodiments, an individual monosaccharide unit of the HHMP can have 1, 2, or 3 PG groups, and an individual monosaccharide unit of the HHMP can have 1, 2, or 3 NPG groups.

In some embodiments, the HHMP includes a monosaccharide repeating unit having the structure

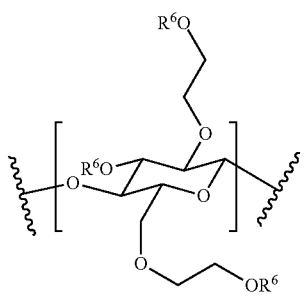

In some embodiments, on an individual monosaccharide unit, 1, 2, or 3 of the $R^6$ variables on the structure can be selected from PG groups and NPG groups, with the remainder equal to hydrogen atoms.

In some embodiments, the HHMP includes a monosaccharide repeating unit having the structure In some embodiments, q2/(q1+q2+q3) is about 0.000,01 to about 0.999,99, about 0.05 to about 0.60, or about 0.11 to about 0.45, or about 0.000,01 or less, or about 0.000,05, 0.000,1, 0.000,5, 0.001, 0.005, 0.01, 0.05, 0.1, 0.15, 0.2, 0.25, 0.3, 0.35, 0.4, 0.45, 0.5, 0.55, 0.6, 0.65, 0.7, 0.8, 0.9, 0.95, 0.99, 0.995, 0.999, 0.999,5, 0.999,9, 0.999,95, or about 0.999,99 or more. In some embodiments, q3/(q1+q2+q3) is about 0.000,01 to about 0.999,99, about 0.0015 to about 0.0090, or about 0.0033 to about 0.0064 NPG groups per monosaccharide unit, or about 0.000,01 or less, or about 0.000,05, 0.000,1, 0.000,5, 0.001, 0.002, 0.002,5, 0.003, 0.003,5, 0.004, 0.004,5, 0.005, 0.005,5, 0.006, 0.006,5, 0.007, 0.007,5, 0.008, 0.008,5, 0.009, 0.01, 0.05, 0.1, 0.15, 0.2, 0.25, 0.3, 0.35, 0.4, 0.45, 0.5, 0.55, 0.6, 0.65, 0.7, 0.8, 0.9, 0.95, 0.99, 0.995, 0.999, 0.999,5, 0.999,9, 0.999,95, or about 0.999,99 or more.

In some embodiments, at each occurrence hydrophilic group PG can be independently -L-$(C_0$-$C_{10})$alkyl-A. At each occurrence A can be independently selected from the group consisting of —C(O)O$^-$CI$^+$, —S(O)(O)O$^-$CI$^+$, and —P(O)(O)(O$^-$CI$^+$)(O$^-$R$^+$). At each occurrence cr can be independently a counterion. At each occurrence R$^+$ can be independently selected from the group consisting of H$^+$ and CI$^+$. At each occurrence CI$^+$ can be selected from the group consisting of Na$^+$, K$^+$, Li$^+$, Zn$^+$, and NH$_4^+$. At each occurrence L can be independently selected from the group consisting of $(C_1$-$C_5)$alkyl substituted with 0, 1, 2, or 3 —OH and interrupted or terminated by 0, 1, 2, or 3 oxygen atoms, and —[R$^9]_n$—. At each occurrence R$^9$ can be independently $(C_1$-$C_5)$alkyl substituted with 0, 1, 2, or 3 —OH, interrupted or terminated by 0, 1, 2, or 3 oxygen atoms, and at each occurrence n can be independently about 2 to about 5. At each occurrence hydrophobic group NPG can be independently -L-$(C_{10}$-$C_{50})$alkyl. The quantity q2/(q1+q2+q3) can be about 0.05-0.60, and q3/(q1+q2+q3) can be about 0.0015 to about 0.0090.

In some embodiments, the HHMP includes, in a random or block copolymer arrangement, the structure

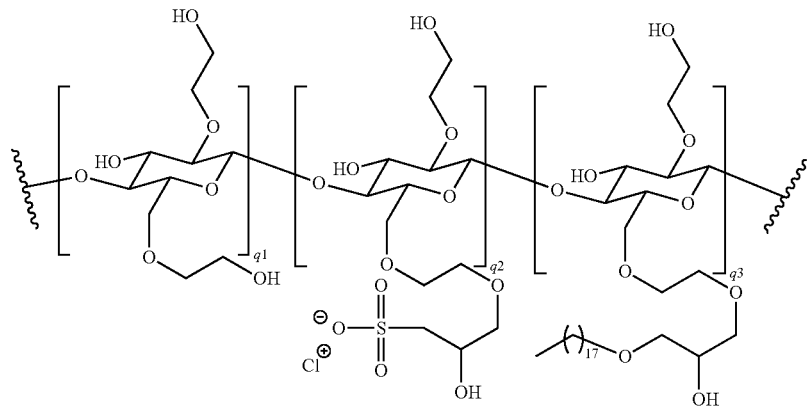

In various embodiments, Cl+ is any suitable positively charged counterion, such as any suitable positively charged counterion. For example, the counterion can be sodium (Na+), potassium (K+), lithium (Li+), hydrogen (H+), zinc (Zn+), or ammonium (NH$_4^+$). In some embodiments, the counterion can have a positive charge greater than +1, which can in some embodiments complex to multiple ionized groups, such as Ca$^{2+}$, Mg$^{2+}$, Zn$^{2+}$, or Al$^{3+}$ (e.g., in some embodiments a single Cl+ can be complexed with multiple anionic —O$^-$ groups). In some embodiments, at each occurrence Cl+ is selected from the group consisting of Na+, K+, Li+, Zn+, NH$_4^+$, Ca$^{2+}$, Mg$^{2+}$, Zn$^{2+}$, and Al$^{3+}$. Cl+ can be Na+.

Downhole Mixture or Composition.

The composition including the hydrophobically and hydrophilically modified polysaccharide (HHMP) can be combined with any suitable downhole fluid before, during, or after the placement of the composition in the subterranean formation or the contacting of the composition and the subterranean material. In some examples, the HHMP is combined with a downhole fluid above the surface, then the combined composition is placed in a subterranean formation or contacted with a subterranean material. In another example, the HHMP is injected or otherwise transported into a subterranean formation to combine with a downhole fluid, and the combined composition is contacted with a subterranean material or is considered to be placed in the subterranean formation. In various examples, at least one of prior to, during, and after the placement of the composition in the subterranean formation or contacting of the subterranean material and the composition, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

In various embodiments, the method includes combining the composition including HHMP with any suitable downhole fluid, such as an aqueous or oil-based fluid including a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture. The placement of the composition in the subterranean formation can include contacting the subterranean material and the mixture. The contacting of the subterranean material and the composition can include contacting the subterranean material and the mixture. A mixture that is placed in the subterranean formation or contacted with the subterranean material can include any suitable weight percent of the composition including HHMP, such as about 0.000,000,01 wt % to 99.999,99 wt %, 0.000,1-99.9 wt %, 0.1 wt % to 99.9 wt %, or about 20-90 wt %, or about 0.000,000,01 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999,9, or about 99.999,99 wt % or more of the composition.

In some embodiments, the composition can include any suitable amount of any suitable material used in a downhole fluid. For example, the composition can include water, saline, aqueous base, oil, organic solvent, synthetic fluid oil phase, aqueous solution, alcohol or polyol, cellulose, starch, alkalinity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, dispersants, salts, fibers, thixotropic additives, breakers, crosslinkers, rheology modifiers, curing accelerators, curing retarders, pH modifiers, chelating agents, scale inhibitors, enzymes, resisn, water control materials, oxidizers, markers, Portland cement, pozzolana cement, gypsum cement, high alumina content cement, slag cement, silica cement fly ash, metakaolin, shale, zeolite, a crystalline silica compound, amorphous silica, hydratable clays, microspheres, pozzolan lime, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reducing friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks penetrated and also to form a thin, low permeability filter cake which temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g. barium sulfate), surfactants (e.g. betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g. silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture. The drilling fluid can be present in the mixture with the composition including HHMP in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, Composition and Properties of Drilling and Completion Fluids 66-67, 561-562 (5$^{th}$ ed. 1988). An oil-based or invert emulsion-based drilling fluid can include between about 50:50 to about 95:5 by volume of oil phase to water phase. A substantially all oil mud includes about 100% liquid phase oil by volume; e.g., substantially no internal aqueous phase.

A pill is a relatively small quantity (e.g. less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The composition including HHMP can form a useful combination with cement or cement kiln dust. The cement kiln dust can be any suitable cement kiln dust. Cement kiln dust can be formed during the manufacture of cement and can be partially calcined kiln feed which is removed from the gas stream and collected in a dust collector during manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention, for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the present invention can include a proppant, a resin-coated proppant, an encapsulated resin, or a combination thereof. A proppant is a material that keeps an induced hydraulic fracture at least partially open during or after a fracturing treatment. Proppants can be transported downhole to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, manmade materials such as ceramic proppant. In some embodiments, proppant can have an average particle size of about 0.15 mm to about 2.5 mm, about 0.25-0.43 mm, 0.43-0.85 mm, 0.85-1.18 mm, 1.18-1.70 mm, and 1.70-2.36 mm.

The composition can include a payload material. The payload can be deposited in any suitable downhole location. The method can include using the composition to deposit a payload material into a subterranean fracture. The subterranean fracture can be any suitable subterranean fraction. In some embodiments, the method includes forming the subterranean fracture; in other embodiments, the subterranean fracture is already formed. The payload material can be a proppant, or any other suitable payload material, such as a resin-coated proppant, a curable material, an encapsulated resin, a resin, a Portland cement, a pozzolana cement, a gypsum cement, a high alumina content cement, a slag cement, a silica cement, a cementitous kiln dust, fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

Drilling Assembly.

The exemplary composition including the hydrophobically and hydrophilically modified polysaccharide (HHMP) disclosed herein may directly or indirectly affect one or more components or pieces of equipment associated with the preparation, delivery, recapture, recycling, reuse, and/or disposal of the disclosed composition including HHMP. For example, and with reference to FIG. 1, the disclosed composition including HHMP may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

The composition including HHMP may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, composition including HHMP may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the composition including HHMP may be stored, reconditioned, and/or regulated until added to the drilling fluid 122.

As mentioned above, the composition including HHMP may directly or indirectly affect the components and equipment of the drilling assembly 100. For example, the composition including HHMP may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used store, monitor, regulate, and/or recondition the composition including HHMP.

The composition including HHMP may directly or indirectly affect the pump 120, which representatively includes any conduits, pipelines, trucks, tubulars, and/or pipes used to fluidically convey the composition including HHMP downhole, any pumps, compressors, or motors (e.g., topside or downhole) used to drive the composition into motion, any valves or related joints used to regulate the pressure or flow rate of the composition, and any sensors (e.g., pressure, temperature, flow rate, etc.), gauges, and/or combinations thereof, and the like. The composition including HHMP may also directly or indirectly affect the mixing hopper 134 and the retention pit 132 and their assorted variations.

The composition including HHMP may also directly or indirectly affect the various downhole equipment and tools that may come into contact with composition including HHMP such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The composition including HHMP may also directly or indirectly affect any downhole heat exchangers, valves and corresponding actuation devices, tool seals, packers and other wellbore isolation devices or components, and the like associated with the wellbore 116. The composition including HHMP may also directly or indirectly affect the drill bit 114, which may include, but is not limited to, roller cone bits, PDC bits, natural diamond bits, any hole openers, reamers, coring bits, etc.

While not specifically illustrated herein, the composition including HHMP may also directly or indirectly affect any transport or delivery equipment used to convey the composition including HHMP to the drilling assembly 100 such as, for example, any transport vessels, conduits, pipelines, trucks, tubulars, and/or pipes used to fluidically move the composition including HHMP from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

System.

In various embodiments, the present invention provides a system. The system can include a composition including a hydrophobically and hydrophilically modified polysaccharide (HHMP), such as any HHMP described herein. The system can also include a subterranean formation including the composition therein. In some embodiments, the composition in the system can also include at least one of a downhole fluid, a gel, a crosslinked gel, and a crosslinker. The HHMP can be crosslinked or uncrosslinked. Crosslinked HHMP can be crosslinked to other HHMP, to other gels, or both.

Composition for Treatment of a Subterranean Formation.

Various embodiments provide a composition for treatment of a subterranean formation. The composition can be any suitable composition that can be used to perform an embodiment of the method for treatment of a subterranean formation described herein. For example, the composition can include a hydrophobically and hydrophilically modified polysaccharide (HHMP), such as any HHMP described herein. In some embodiments, the composition further includes at least one of a gel, crosslinked gel, and a crosslinker. The HHMP can be crosslinked or uncrosslinked. Crosslinked HHMP can be crosslinked to other HHMP, crosslinked to other gels, or both.

In some embodiments, the composition further includes a downhole fluid. The downhole fluid can be any suitable downhole fluid, such as a fracturing fluid or a drilling fluid. In some embodiments, the composition is a composition for fracturing of a subterranean formation or subterranean material, or a fracturing fluid. The composition can be a composition for drilling, or for gravel packing.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including a hydrophobically and hydrophilically modified polysaccharide (HHMP), such as any HHMP described herein. In some embodiments, the method can include treatment of a suitable polysaccharide such as cellulose or a cellulose derivative with a hydrophilic modifying agent, such as 3-chloro-2-hydroxypropanesulfonic acid. In some embodiments, the method can include treatment of a suitable polysaccharide such as cellulose or a cellulose derivative with a hydrophobic modifying agent, such as stearylglycidyl ether.

EXAMPLES

The present invention can be better understood by reference to the following Examples which are offered by way of illustration. The present invention is not limited to the Examples given herein.

These Examples appear in E. Akiyama et al., *Journal of Colloid and Interface Science,* 2005, 282(2), 448-457 and K. Kawakami, *Langmuir,* 2006, 22(7), 3337-43.

Example 1. General Properties

General.

Water-Soluble Polymers.

The water-soluble polymers used in this Example were: (1) hydrophilically-hydrophobically modified hydroxyethylcellulose (HHM-HEC), (2) alkyl chain-bearing HEC (R-HEC), (3) sulfonic acid-bearing HEC (S-HEC), (4) HEC (HEC QP-IOOMH, Union Carbide Corporation).

TABLE 1

HHM-HEC used in this Example.

| Sample name | Number of alkyl chain moieties (per monosaccharide unit) | Number of sulfonic acid moieties (per monosaccharide unit) |
| --- | --- | --- |
| HHM-HEC(A) | 0.0064 | 0.11 |
| HHM-HEC(B) | 0.0062 | 0.25 |
| HHM-HEC(C) | 0.0033 | 0.21 |

The structures of compounds (2) to (4) are shown below.

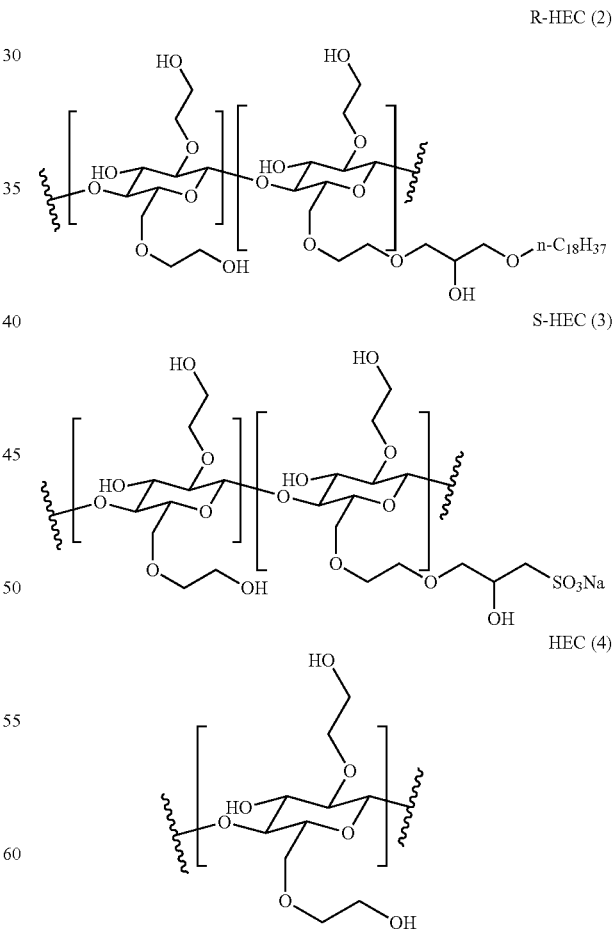

The compounds (1)-(3) were synthesized from the HEC (4) with stearylglycidyl ether and 3-chloro-2-hydroxypropanesulfonic acid under alkaline conditions. For compound (2), only alkyl chain moieties were introduced, and for compound (3), only sulfonic acid moieties. Compound (1) has both alkyl chain and sulfonic acid moieties. The HEC (4) had molecular weight of about 1,500,000.

Oils.

The oil materials used in this work were: (1) squalane (NIKKOL squalane, NIKKO Chemicals Co., Ltd.), (2) dimethyl polysiloxane (silicone KF-96A(6cs), ShinEtsu Chemical Co., Ltd.), (3) isotridecyl isononanoate (Salacos 913, The Nisshin Oil Mills, Ltd.), (4) perfluoropolymethylisopropyl ether (FOMBLIN HC/04, Ausimont).

Preparation of Emulsions.

Each water-soluble polymer was thoroughly suspended and swelled in water. Various oil/water (O/W) emulsions were prepared by adding oil to aqueous solutions of polymer with stirring using a propeller mixer at 400 rpm for 5 min. After the premix, solutions were stirred by a laboratory homomixer at 3000 to 6000 rpm for 10 min at 25° C.

Viscosity Measurements.

The viscosity of each water solution 9f polymer and emulsion was measured using a Toki-Sangyo Model B viscometer (88L, Rotor No. 4, 6 rpm) at 25° C. The measurement errors are within less than 5.0%.

Particle Size Measurements.

The photomicrograph of the emulsion was obtained using a photomicroscope (Nikon OPTIPHOT-2). The droplet size distribution was determined using a laser-scattering particle size distribution analyzer (HORIBA LA-920) at 25° C. Measurements were carried out after appropriate dilution of the sample emulsion with water. It was confirmed in advance that the dilution process did not significantly change the particle size. The measurement errors were within less than 0.7%.

Surface and Interfacial Tension Measurements.

The surface tension of aqueous polymer solution and the interfacial tension of aqueous polymer solution against oil were measured using a Wilhelmy type automated surface tension meter (KRUSS processor tension meter, K122) with a platinum plate at 25° C. The measurement errors are within less than 1.8%.

Rheological Measurements.

Rheological measurements of each aqueous solution of polymer and emulsion were carried out using a rheometer (Rheometric RFS II) at 25° C. Couette geometry (cup diameter 34.0 mm, bob diameter 32.0 mm, bob length 33.4 mm) was used. Steady rate flow measurements were carried out at rates 0.1, 0.5, 1.0, and 5.0 s$^{-1}$. Oscillatory measurements were carried out at a strain value within the linear regime and a frequency $\omega$=0.1 to 100 s$^{-1}$. The storage (G') and loss (G") moduli were obtained.

Example 1.1. HHM-HEC Emulsions

Example 1.1.1. O/W Emulsions Stabilized by HHM-HEC

Figure 2:
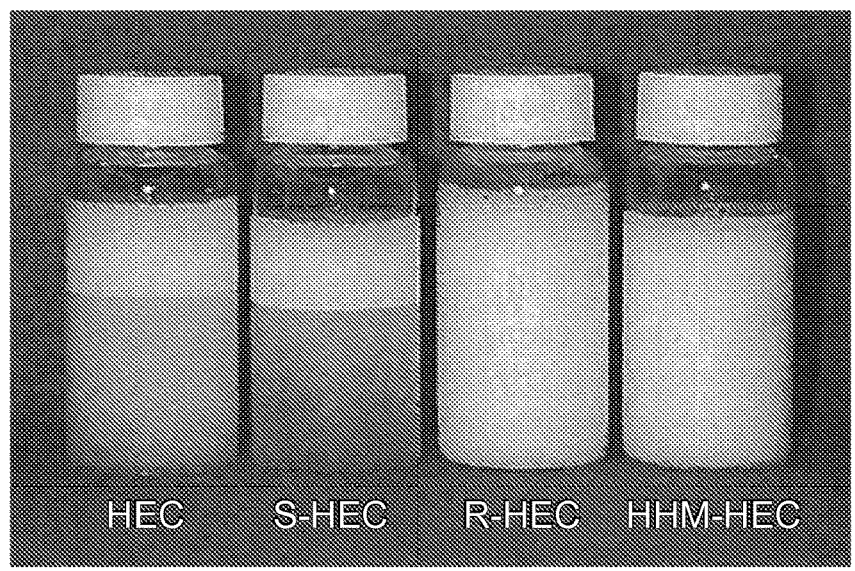
FIG. 2 is a photograph of emulsions of HEC derivatives, in accordance with various embodiments.

The appearance of the O/W emulsions is shown in FIG. 2, which shows a photograph of emulsions of HEC derivatives. The oil phase is 16 wt % squalane, and the water phase is an aqueous solution of HHM-HEC, R-HEC, S-HEC, or HEC at 0.5 wt %. Apparent creaming was observed for the emulsions of HEC and S-HEC. Moreover, oil phase separated out at the surface. In contrast, emulsions of HHM-HEC and R-HEC were stable. Viscosity and mean particle diameter are listed in Table 2. Reproduction among the emulsion samples using different batches of HHM-HEC has an error of 9.4% for viscosity and 4.6% for median particle size.

TABLE 2

Viscosity and particle size of O/W emulsions of HEC derivatives.

|  | HEC | S-HEC | R-HEC | HHM-HEC |
|---|---|---|---|---|
| Viscosity (mPa · s) | 1600 ± 600 | 140 ± 50 | 9800 ± 2400 | 6400 ± 600 |
| Particle size (μm) | 46.56 ± 3.2 | 47.8 ± 3.0 | 32.9 ± 1.4 | 23.6 ± 1.1 |

Figure 3:
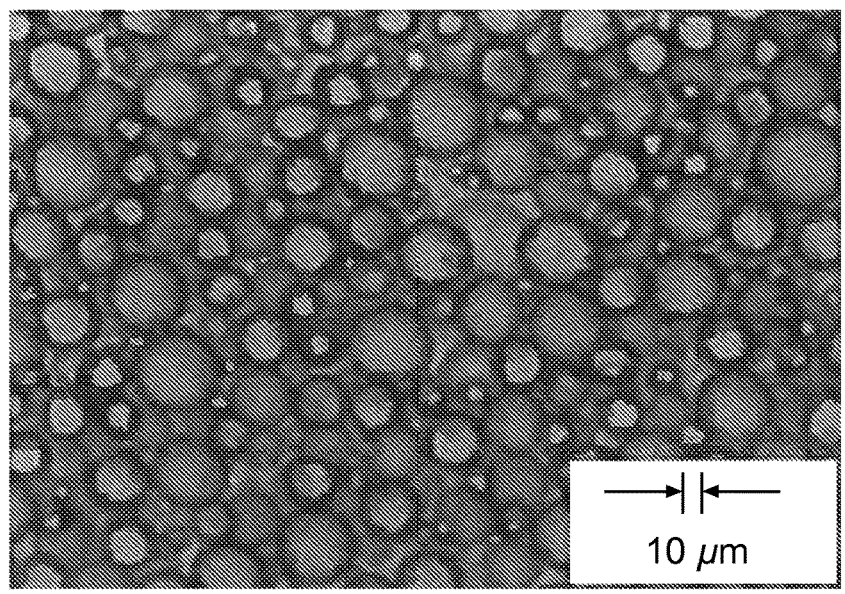
FIG. 3 is a photomicrograph of an emulsion of HHM-HEC, in accordance with various embodiments.
Figure 4:
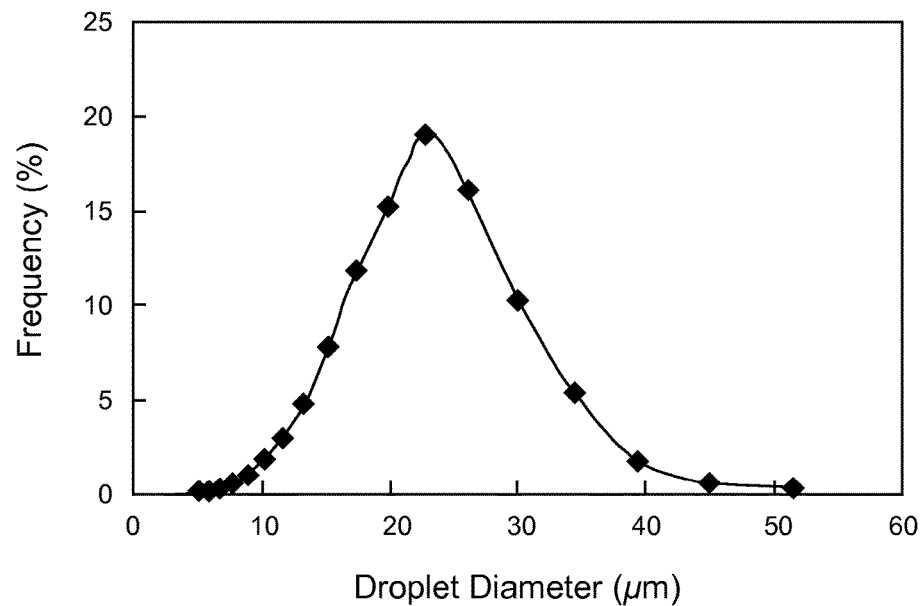
FIG. 4 illustrates droplet diameter distribution by volume for an emulsion of HHM-HEC, in accordance with various embodiments.

A photomicrograph image of the emulsion of the HHM-HEC/water/squalane system is shown in FIG. 3. The distribution of particle size in the emulsion is shown in FIG. 4. The particle size of the emulsion varied in broad distribution and was much larger than that of conventional O/W emulsion using low-molecular-weight surfactants. It is characteristic of emulsions emulsified by high-molecular-weight polymers.

Example 1.1.2. Effect of Oil on the Viscosity of Emulsions of HHM-HEC

Figure 5:
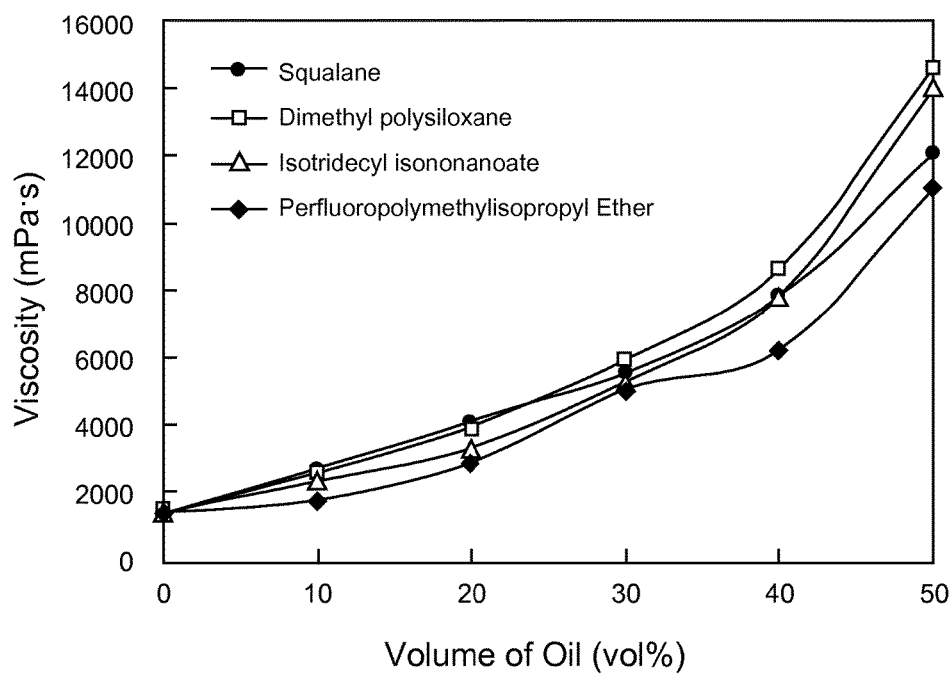
FIG. 5 illustrates viscosity of various emulsions with HHM-HEC as a function of volume of oil, in accordance with various embodiments.

FIG. 5 shows the effect of oil on the viscosity of emulsions. Four kinds of oil, squalane, dimethylpolysiloxane, isotridecyl isononanoate, and perfluoropolymethyl isopropyl ether, were used as the oil phase in the emulsion. The concentration of HHM-HEC in water was constant, [HHM-HEC]=0.5 (wt %).

Example 1.2. Thickening Properties of Aqueous Solution of HHM-HEC

Figure 6A:
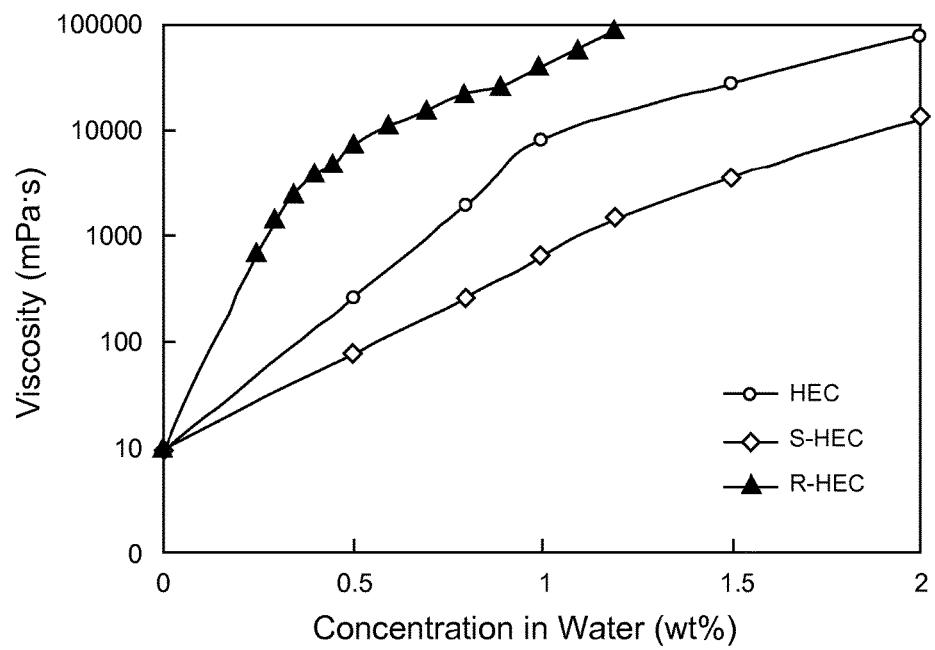
FIG. 6a illustrates viscosity as a function of concentration of HEC, S-HEC, and R-HEC, in accordance with various embodiments.
Figure 6B:
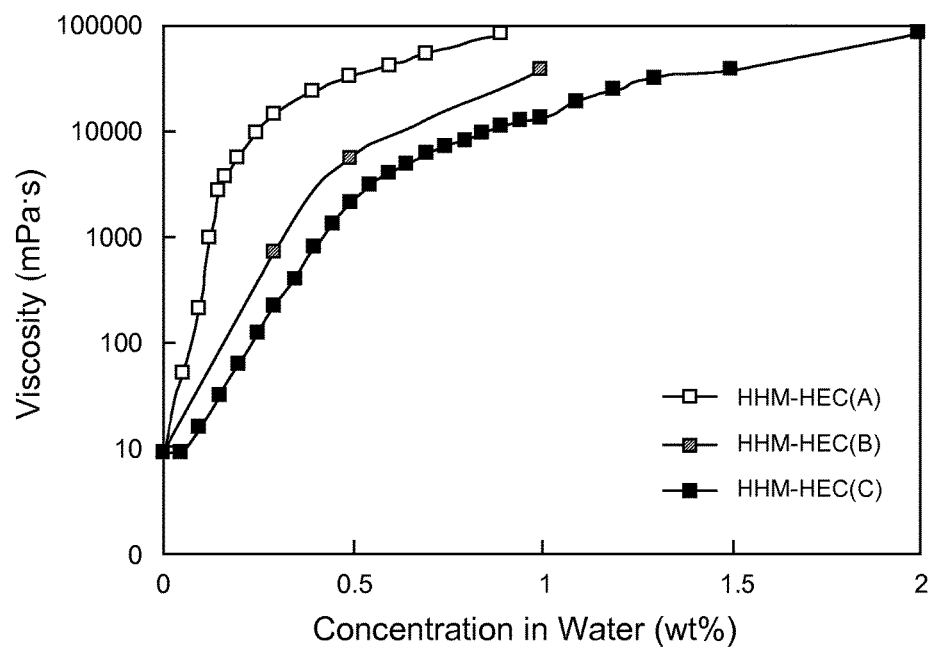
FIG. 6b illustrates viscosity as a function of concentration of HHM-HEC (A), HHM-HEC (B), and HHM-HEC (C), in accordance with various embodiments.

The properties of the aqueous solution of HHM-HEC were measured in order to determine the properties of the HHM-HEC/water/oil emulsion system. The thickening curves for aqueous solutions of HEC, R-HEC, and S-HEC are shown in FIG. 6a. Viscosity increased dramatically when alkyl chain moieties were introduced into HEC, and increased gently when sulfonic acid moieties were introduced. R-HEC had a good thickening ability but it could not dissolve in water completely. The aqueous solution of R-HEC was slightly turbid because of the low solubility. FIG. 6b shows the thickening curves of aqueous solution of samples HHM-HEC (A), (B), (C), where (A), (B), and (C) have different ratios of alkyl chains to sulfonic acid moieties as shown in Table 1. The viscosity increased dramatically with increase in alkyl chains (compare (B) and (C)), but gently with increase in sulfonic acid moieties (compare (A) and (B)). The thickening ability can be controlled by the ratio of alkyl chains to sulfonic acid moieties.

Example 1.3. Surface and Interfacial Tension

The surface tensions of 0.5 wt % aqueous solutions of HHM-HEC and HEC are shown in Table 4. Measurements were carried out for a period of 5 h. At first, the surface tension decreased and thereafter became constant. Reproduction among the solution samples of different batches of HHM-HEC was within an error of 6.3%.

TABLE 4

Surface tension of aqueous solution of polymers

| Solution | Water (25° C.) | HHM-HEC | HEC |
|---|---|---|---|
| Surface tension (dyn/cm) | 71.96 | 56.8 ± 3.8 | 53.6 ± 2.7 |

The interfacial tension of HHM-HEC/water/oil and HEC/water/oil systems is shown in Table 5. The concentration of the aqueous solution of the polymers was 0.5 wt %. The oil phase was squalane, dimethyl polysiloxane, or isotridecyl isononanoate. Measurements were carried out for 10 min, and values of the interfacial tension were almost constant for the measurement period. Reproduction among the solution samples of different batches of HHM-HEC is within an error of 4.3%.

TABLE 5

Interfacial tension of aqueous solution of polymer/oil interface.

| System | Squalane | Dimethyl polysiloxane | Isotridecyl isononanoate |
|---|---|---|---|
| Water/oil (dyn/cm) | 45.4 ± 0.8 | 41.4 ± 0.7 | 33.5 ± 0.6 |
| HHM-HEC/water/oil (dyn/cm) | 32.3 ± 1.5 | 28.2 ± 1.2 | 25.3 ± 1.1 |
| HEC/water/oil (dyn/cm) | 28.9 ± 0.5 | 27.4 ± 0.5 | 24.7 ± 0.4 |

Example 1.4. Rheology

Figure 7:
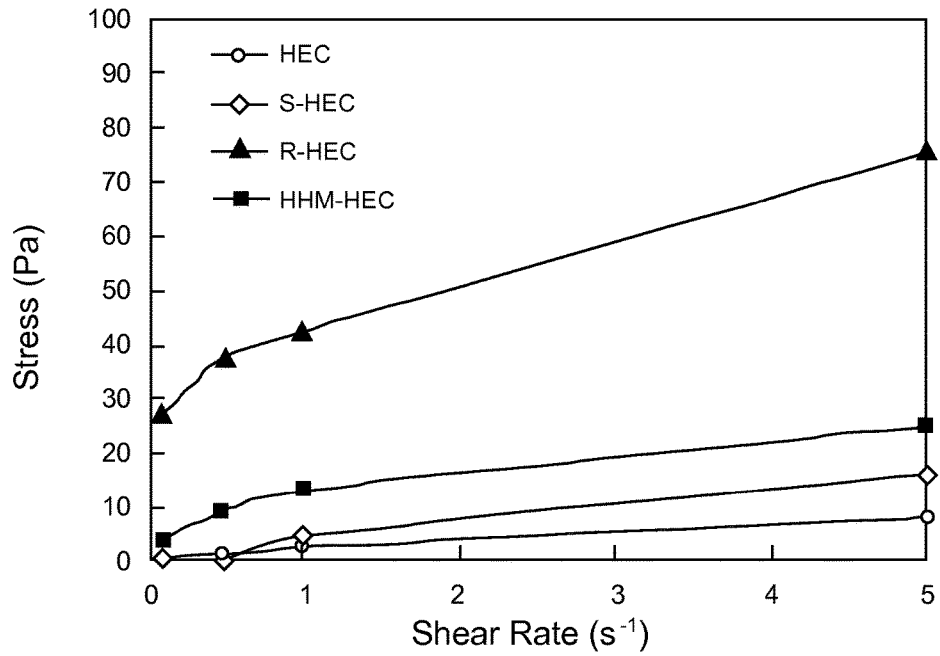
FIG. 7 illustrates shear rate dependence on stress for various HEC derivatives, in accordance with various embodiments.

The shear rate dependence on the stress is shown in FIG. 7, with [HEC derivatives]=1.0 (wt %).

Figure 8A:
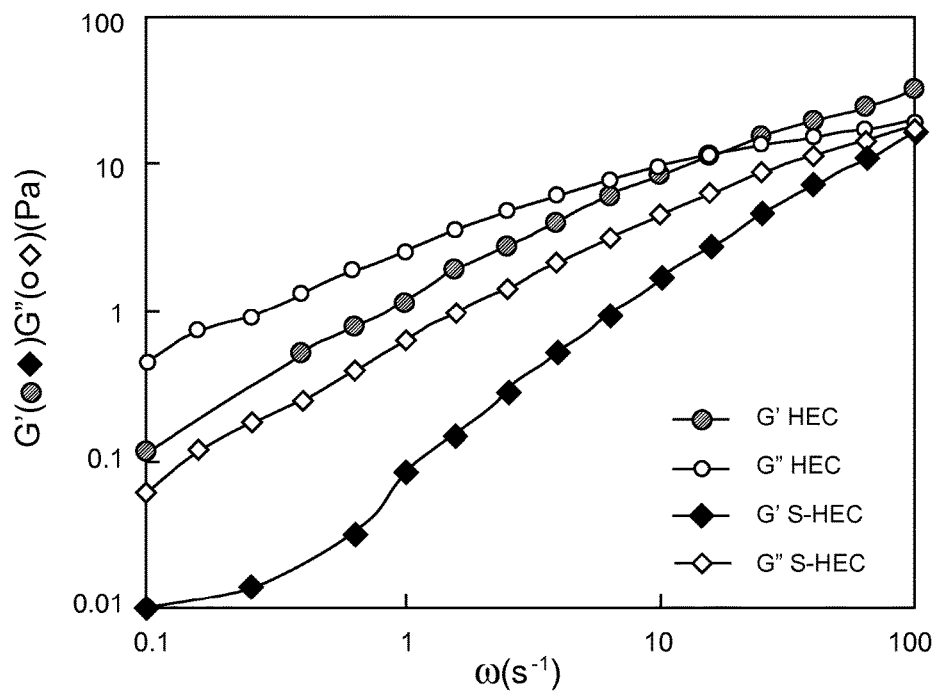
FIG. 8a illustrates the storage modulus, G', and the loss modulus, G", of HEC and S-HEC, in water, in accordance with various embodiments.
Figure 8B:
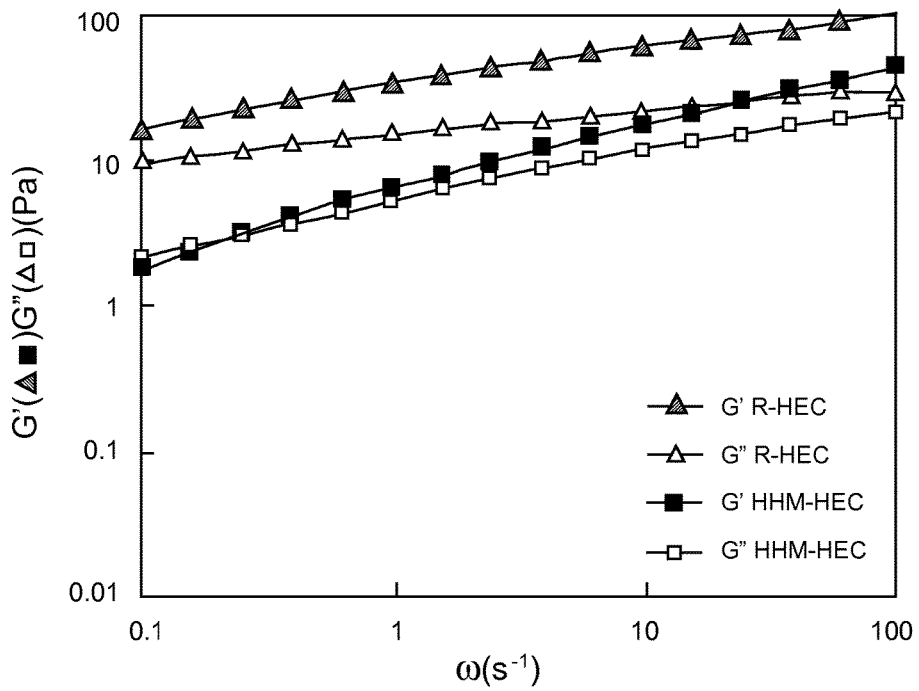
FIG. 8b illustrates the storage modulus, G', and the loss modulus, G" of R-HEC, HHM-HEC in water, in accordance with various embodiments.

Oscillatory measurement results are shown in FIGS. 8a-b, which show the storage modulus, G', and the loss modulus, G", of (9a) HEC, S-HEC, (9b) R-HEC, HHM-HEC in water at 25° C. [HEC derivative]=1.0 (wt %).

Figure 9:
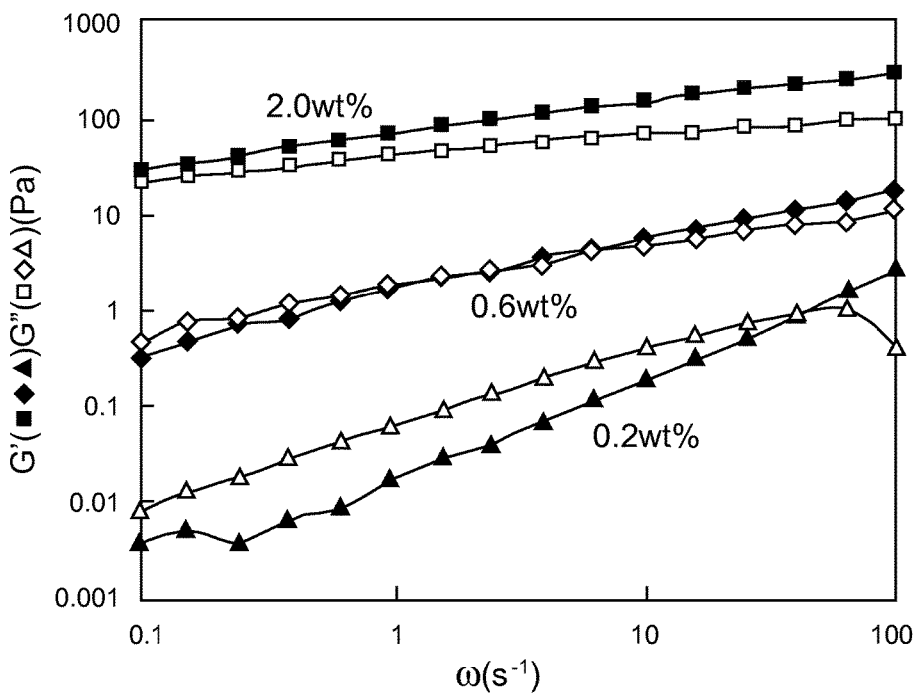
FIG. 9 illustrates the storage modulus, G' (filled circles), and loss modulus, G", (unfilled circles), of various concentrations of HHM-HEC in water, in accordance with various embodiments.

FIG. 9 illustrates the effect of concentration of HHM-HEC upon the dynamic storage modulus and loss modulus. FIG. 9 shows the storage modulus, G' (filled circles), and loss modulus, G", (unfilled circles), of HHM-HEC in water at 25° C., with [HHM-HEC]=0.2, 0.6, or 1.0 (wt %). Below 0.6 wt % the value of G' was smaller than that of G" and the solution is revealed to be predominantly viscous. At 0.6 wt %, the values of G' and G" become closer to each other. Above 0.6 wt % the value of G' was larger than that of G" and the solution is predominantly elastic (gel-like). The critical point of the curve of HHM-HEC(C) in FIG. 6b was about 0.6 wt %, meaning that the rheology of HHM-HEC changes from viscous to elastic at this concentration.

Figure 10A:
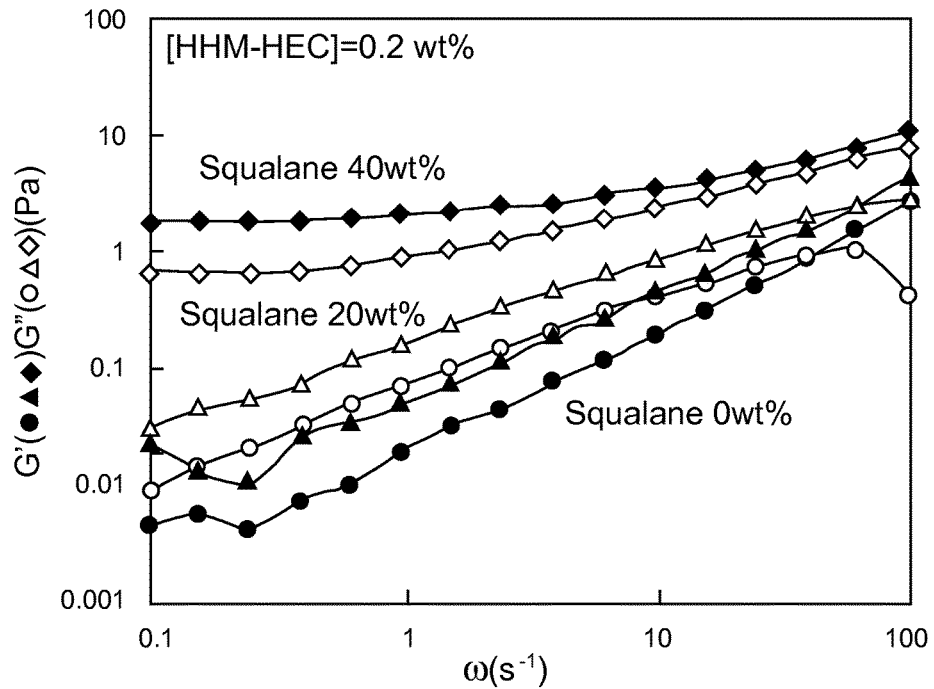
FIG. 10a illustrates the storage modulus and loss modulus of an aqueous solution of HHM-HEC and aqueous emulsions of HHM-HEC with various concentrations of squalane, in accordance with various embodiments.
Figure 10B:
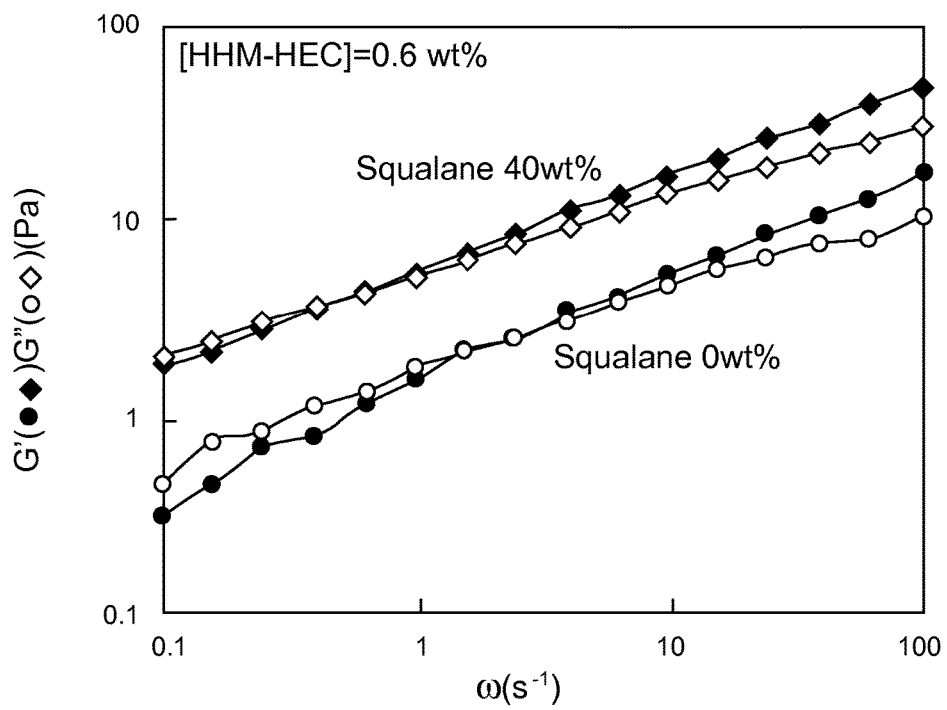
FIG. 10b illustrates the storage modulus and loss modulus of an aqueous solution of HHM-HEC and aqueous emulsions of HHM-HEC with various concentrations of squalane, in accordance with various embodiments.
Figure 10C:
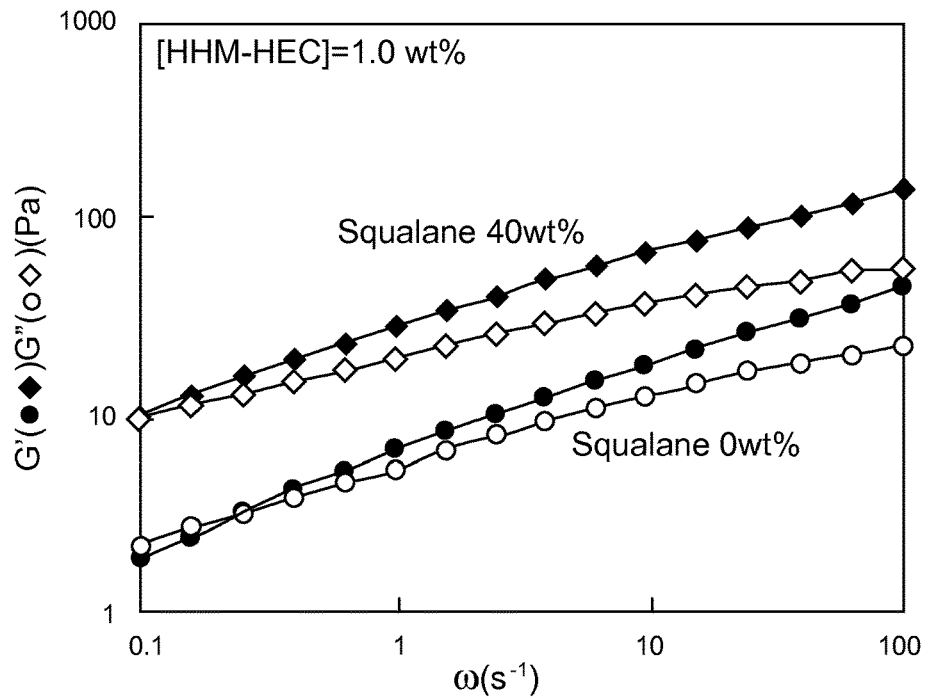
FIG. 10c illustrates the storage modulus and loss modulus of an aqueous solution of HHM-HEC and aqueous emulsions of HHM-HEC with various concentrations of squalane, in accordance with various embodiments.

Oscillatory measurements of the emulsion were carried out to elucidate the relationship between aqueous solutions of HHM-HEC and emulsion of the HHM-HEC/water/squalane system. The concentration of HHM-HEC in water was kept constant. The results are shown in FIGS. 10a-c, which shows the storage modulus, G' (filled circles), and loss modulus, G" (unfilled circles), of aqueous solution and emulsion of HHM-HEC at 25° C. The concentration of HHM-HEC in water was constant. In FIG. 10a, [HHM-HEC]=0.2 wt % at strain amplitude γ=50% (squalane 0 wt %), γ=10% (squalane 20%), γ=1% (squalane 40%). In FIG. 10b [HHM-HEC]=0.6 wt % at strain amplitude γ=1%. In FIG. 10c, [HHM-HEC]=1.0 wt % at strain amplitude γ=1%.

Example 1.5. Emulsification Properties

Figure 11:
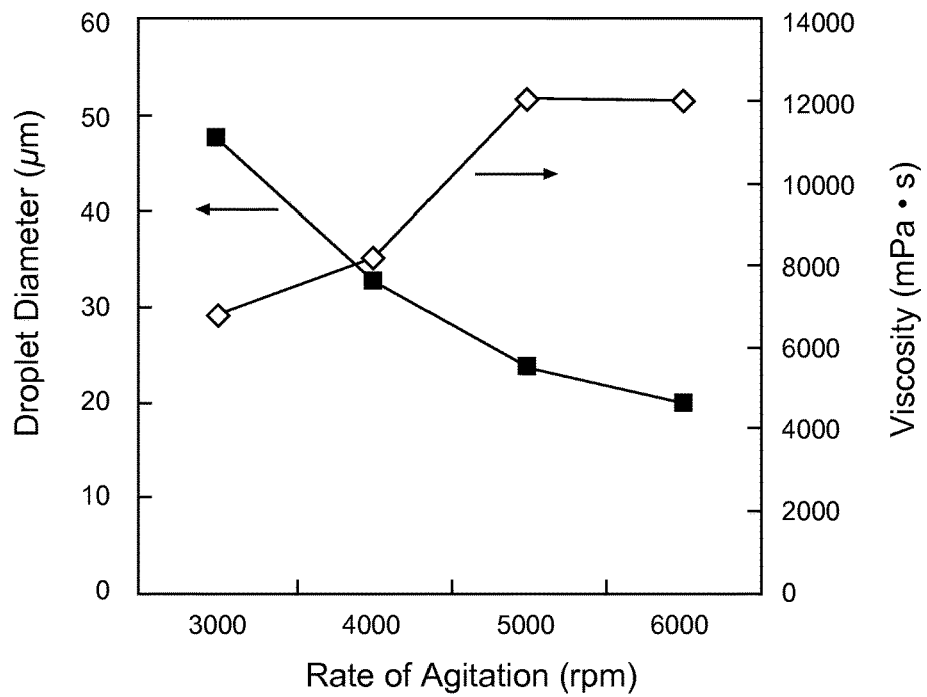
FIG. 11 illustrates droplet diameter and viscosity of HHM-HEC/water/oil emulsions as a function of rate of agitation, in accordance with various embodiments.

In order to evaluate the oil-holding ability of the elastic gel of HHM-HEC, the particle size of emulsions prepared under several conditions was investigated. The emulsions HHM-HEC/water/oil (HHM-HEC 0.6 wt %, squalane 20 wt %) were prepared by a laboratory homomixer at 3000, 4000, 5000, or 6000 rpm. The particle size and viscosity of the emulsion obtained are shown in FIG. 11. The particle size decreased with increasing rate of agitation and this was attributed to kinetic energy. The particle size was stable for a month after preparation under storage at 40° C. Creaming of the emulsion occurred, but no interdrop coalescence was observed. The elastic gel of HHM-HEC was very strong and oil particles were held firmly.

Figure 12:
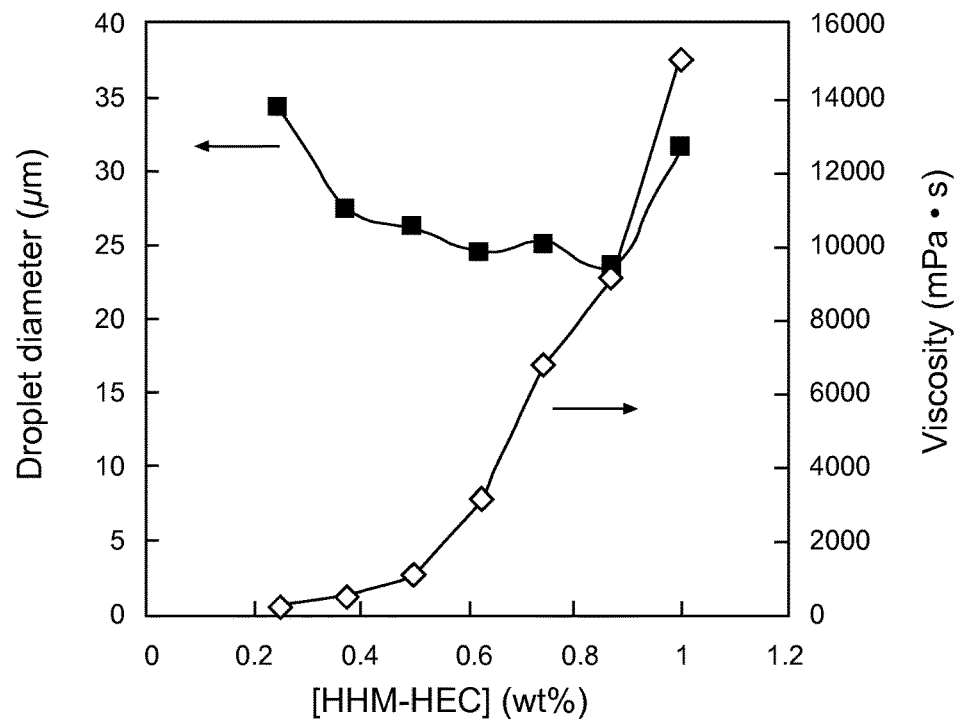
FIG. 12 illustrates droplet diameter and viscosity of squalane/water/HHM-HEC emulsions as a function of the concentration of HHM-HEC, in accordance with various embodiments.

For the HHM-HEC/water/squalane emulsion (squalane=16 wt %), the effect of HHM-HEC concentration on particle size and viscosity was examined. The result is shown in FIG. 12. The particle size decreased with increase in HHM-HEC concentration and was almost unchanged above 0.2 wt %. Below 0.2 wt %, the size of the particles was large and creaming of the emulsion and interdrop coalescence was observed. Between 0.2 and 0.6 wt %, in the liquid-like region, a slight breakage of droplets during preparation and creaming occurred. Between 0.6 and 0.9 wt %, in the region of elastic gel, the particle size was a minimum and held stable without interdrop coalescence. Above 1.0 wt %, the elastic gel of HHM-HEC was formed, but the particle size was large because the kinetic stirring was not sufficient for emulsification (because the viscosity of the prepared emulsion was very high). The viscosity of the emulsion increased with increased HHM-HEC concentration.

Example 1.6. Summary

HHM-HEC showed good solubility in water, salt resistance, and a remarkable increase in viscosity. At higher concentrations of the HHM-HEC tested (above 0.6 wt %) in water, an elastic gel was formed that had good thixotropic properties and a high yield value. The elastic gel of HHM-HEC can hold various kinds of oil particles to high volume (40 vol %) stably. HHM-HEC system is superior in salt resistance to acrylate alkyl methacrylate copolymer and can be applied to various O/W-type emulsions.

Example 2. Salt Tolerance

General.

Materials.

HHM-HEC was synthesized from HEC (having an approximate weight-average molecular weight of $1.2 \times 10^6$) with stearylglycidyl ether and 3-chloro-2-hydroxypropane-sulfonic acid under alkaline conditions, as described previously. The average degree of replacement by the hydrophobic substituent (the stearyl alkyl group) was 0.0036 per monosaccharide unit compared with 0.11 per monosaccharide unit for the hydrophilic substituent (the sulfonic-acid salt group). By contrast, in the HHM-HEC used in fluorescence studies, the average number of hydrophobic substituents was 0.0040, and the average number of hydrophilic substituents was 0.40. Other derivatives, namely hydrophobically modified HEC (R-HEC, wherein the average number of hydrophobic substituents was 0.0040) and hydrophilically modified HEC (S-HEC, wherein the average number of hydrophilic substituents was 0.21), were synthesized using the method described for HHM-HEC. The structures of the HEC derivatives are the same as shown in Example 1. HEC was obtained from the Union Carbide Corporation (under the commercial name of HEC QP-100MH) and had an approximate weight-average molecular weight of $1.5 \times 10^6$. The cross-linked polymer of poly(acrylic acid) was obtained from Noveon, Inc. (under the commercial name of Carbopol 981). The polymers were used without further purification. Deionized and filtrated water was used directly. NaCl and $ZnCl_2$ were the reagent-grade salts.

Sample Preparation.

HHM-HEC was added to hot pure water (70° C.), and the polymer solution was stirred for more than 3 h to dissolve the HHM-HEC completely. Salts were added to the aqueous solution of HHM-HEC at room temperature. Throughout this Example, the respective concentrations of the polymers and salts are denoted by weight. Aqueous solutions of other thickeners were also prepared using a similar protocol. The cross-linked polymer of poly(acrylic acid) was neutralized by KOH. The mixtures were cooled, stirred for 30 min to ensure complete homogeneity, and measured the next day.

Rheological Measurements.

Rheological measurements of the aqueous thickener solutions were performed using a rheometer (Rheometric RFS II; Rheometric Co., Ltd.) fitted with a cone-and-plate geometry (50 mm) at 20±0.5° C. Care was taken not to stir the polymer solutions before measurements. The shear flow viscosities of polymer solutions over a shear rate range of 0.1 to 100 s$^{-1}$ were measured by using the steady-rate sweep method. A thixotropic loop measurement was made using a standardized shearing procedure for thixotropic materials that exhibit shear-dependent and time-dependent flow behaviors. The shear stress was measured as follows: Uniform shear-rate acceleration was provided from 0.1 to 100 s$^{-1}$ with a sweep time of 150 s, followed by uniform shear rate deceleration for 150 s. Oscillatory measurements were carried out over a frequency range of 0.1-100 rad/s at a fixed strain value of γ=20% using the dynamic frequency-sweep method. The loss tangent or tan δ, which represents the ratio of the loss modulus (G") to the storage modulus (G'), was calculated according to tan δ=G"/G'.

Fluorescence Studies.

A freshly prepared pyrene solution in dimethyl sulfoxide (DMSO) at a concentration of 1×10$^{-3}$ M was added to 0.5 wt % HHM-HEC solutions to a final pyrene concentration of 5×10$^{-6}$ M. The mixtures were sonicated for 30 min, and measurements were taken the next day. The fluorescence-emission spectra of the polymer and pyrene probe mixtures were recorded over the range of 350-500 nm using a Hitachi F-4010 fluorescence spectrophotometer. The excitation wavelength was set at 334 nm. The relative intensities of the first ($I_1$=372 nm) and the third ($I_3$=383 nm) vibronic bands of the pyrene monomer emission spectrum were obtained as the ratio $I_1/I_3$.

Turbidity Measurements.

The turbidities of polymer solutions can be measured as optical density (OD) using a UV-visible recording spectrophotometer UV-160 (Shimadzu Corporation) at 600 nm, with water as the blank.

Example 2.1. Salt-Tolerance of HHM-HEC

Figure 13A:
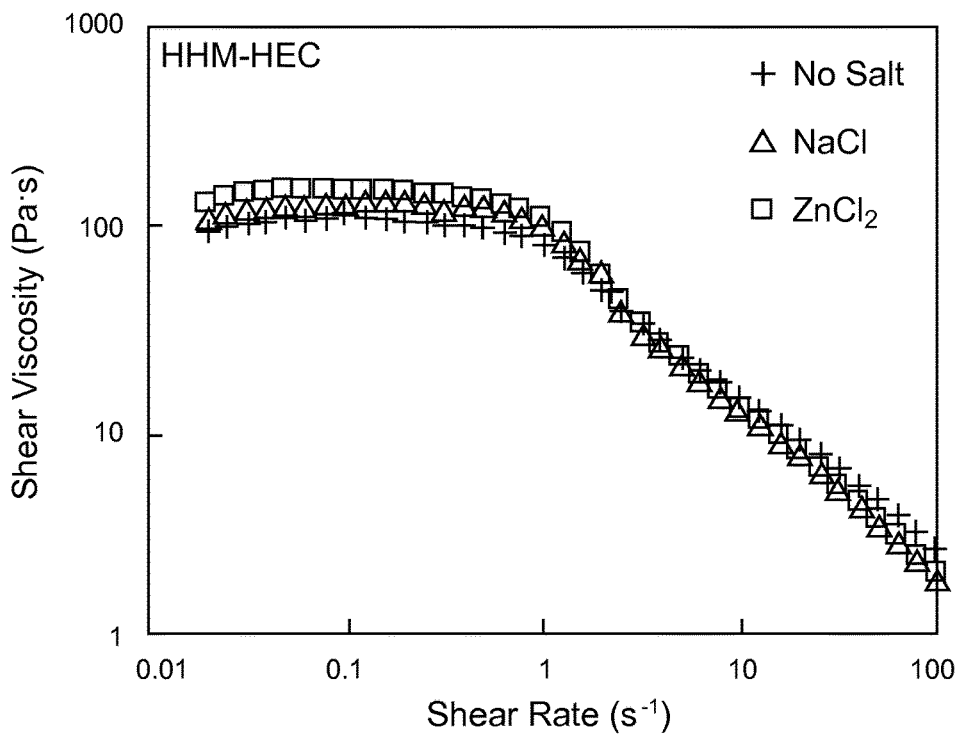
FIG. 13a illustrates shear viscosity versus shear rate for aqueous solutions of HHM-HEC having substantially no salt or having NaCl or $ZnCl_2$ therein, in accordance with various embodiments.
Figure 13B:
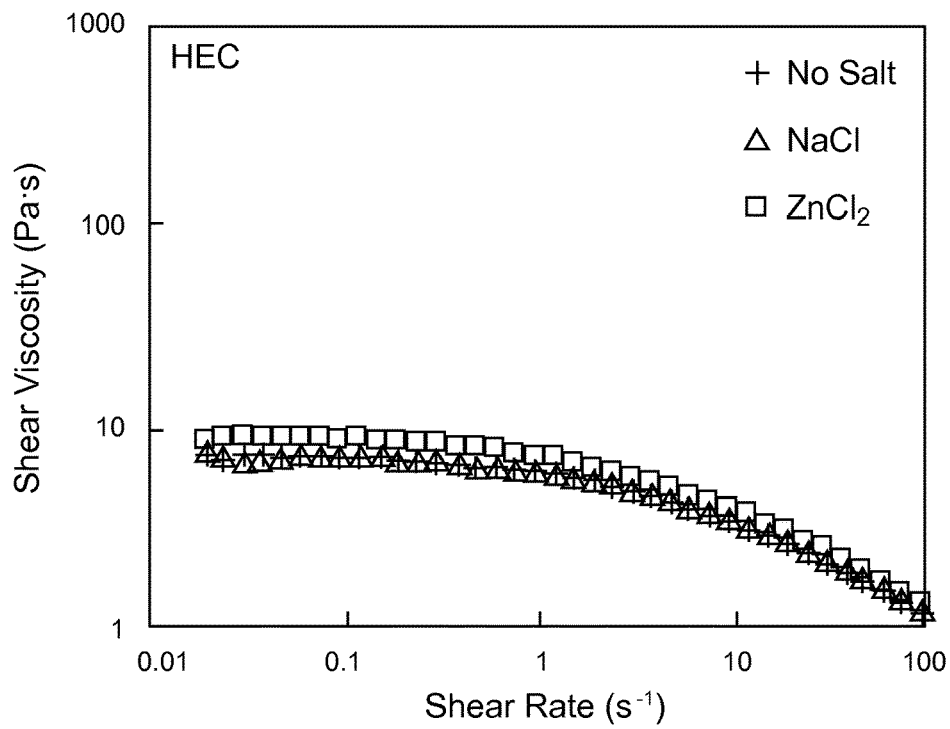
FIG. 13b illustrates shear viscosity versus shear rate for aqueous solutions of HHM-HEC having substantially no salt or having NaCl or $ZnCl_2$ therein, in accordance with various embodiments.
Figure 13C:
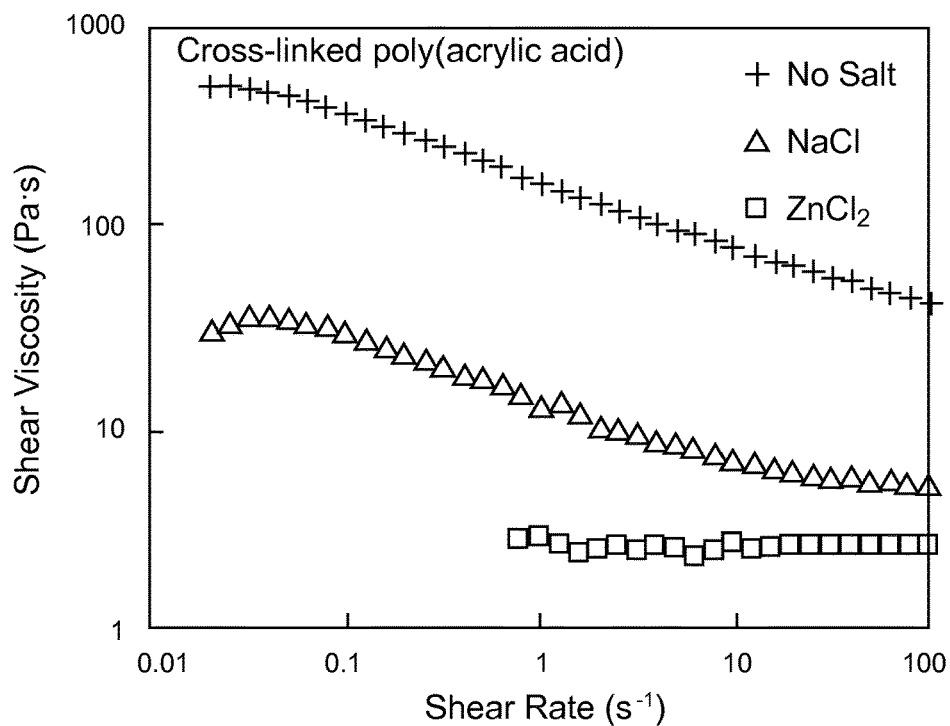
FIG. 13c illustrates shear viscosity versus shear rate for aqueous solutions of HHM-HEC having substantially no salt or having NaCl or $ZnCl_2$ therein, in accordance with various embodiments.

The effects of the addition of NaCl and $ZnCl_2$ on the shear viscosity of HHM-HEC and the other thickeners are shown in FIGS. 13a-c. The concentrations of the thickeners tested in aqueous solutions were 0.5 wt %. The concentrations of NaCl and $ZnCl_2$ were 1 wt % (0.17 M) and 2 wt % (0.15 M), respectively. The thickener used in FIG. 13a was HHM-HEC, in FIG. 13b was HEC, and in FIG. 13c was cross-linked poly(acrylic acid), wherein with and without salt addition at 20° C. is shown.

The viscosity of the HHM-HEC solution was significantly higher than that of HEC, even in the presence of salts.

Figure 14A:
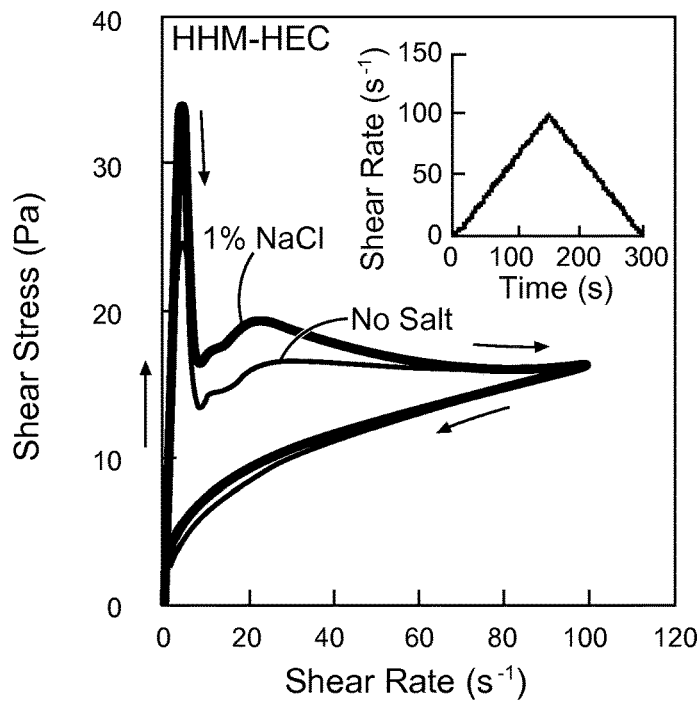
FIG. 14a illustrates thixotropic loops of shear stress versus shear rate for aqueous solutions of HHM-HEC with and without salt, in accordance with various embodiments.
Figure 14B:
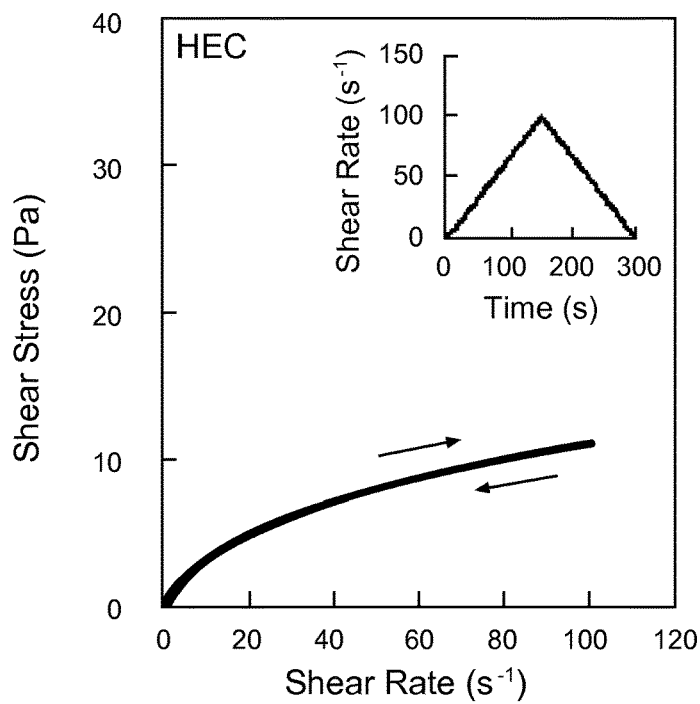
FIG. 14b illustrates thixotropic loops of shear stress versus shear rate for aqueous solutions of HEC with and without salt, in accordance with various embodiments.

Results of thixotropic loop measurements under varying shear-rate conditions are shown in FIGS. 14a-b. FIGS. 14a-b shows thixotropic loops of shear stress versus shear rate for aqueous solutions of HHM-HEC (a) and HEC (b) with salt (thick line) or without salt (thin line) at 20° C. The loop of the HEC solution without salt was overlaid onto the loop with NaCl. The concentrations used were [polymers]=0.5 wt %, [NaCl]=1 wt %. The inset shows the transition of shear rate as a function of time during the thixotropic loop measurement. In FIGS. 14a-c, the peak of the HHM-HEC solution loop observed with 1 wt % NaCl appeared to be higher than that observed without added salts, while the aqueous HEC solution showed no rheological changes. Much greater stress was needed to break down the structure of the HHM-HEC solution in the presence of salts compared to that needed in the salt-free solution; that is, the three-dimensional network structure of the HHM-HEC solution was strengthened with added salts.

Figure 15A:
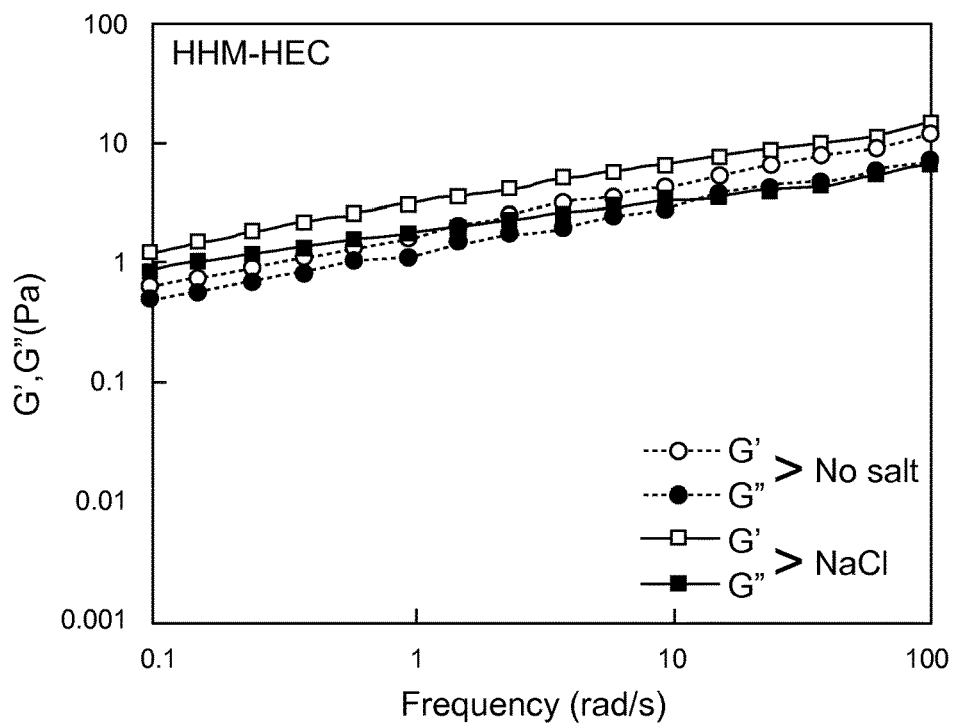
FIG. 15a illustrates storage (G') and loss (G") moduli dependence on the angular frequency for HHM-HEC solutions with and without NaCl, in accordance with various embodiments.
Figure 15B:
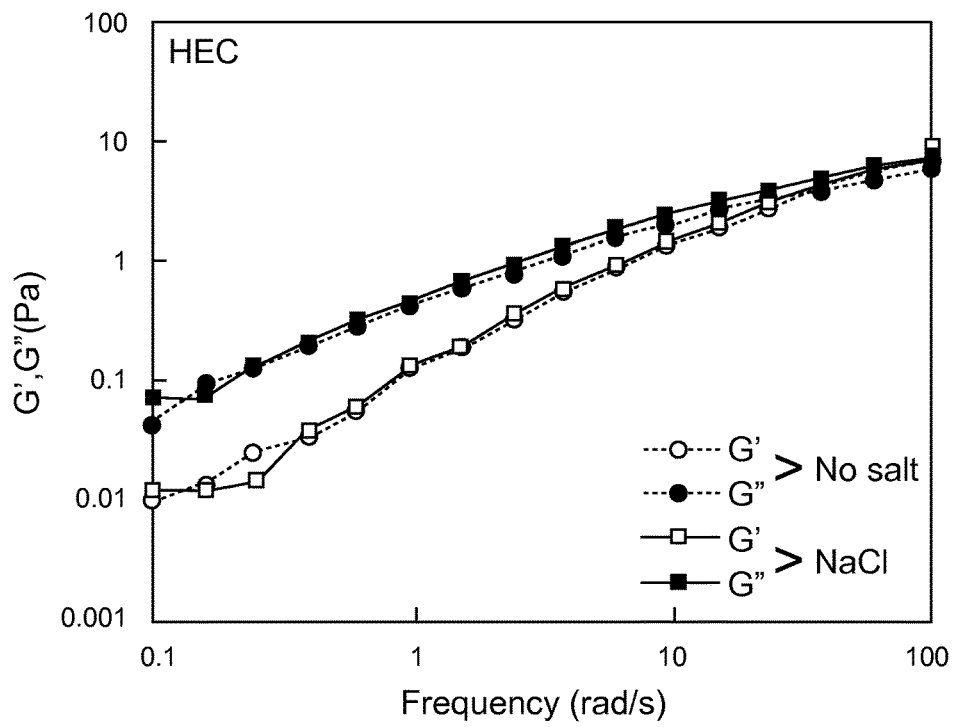
FIG. 15b illustrates storage (G') and loss (G") moduli dependence on the angular frequency for HHM-HEC solutions with and without NaCl, in accordance with various embodiments.

The moduli of the HHM-HEC and HEC solutions were measured at frequencies ranging from 0.1 to 100 Hz with 20% strain, and were plotted in FIGS. 15a-b. FIGS. 15a-b show storage (G') and loss (G") moduli dependence on the angular frequency for HHM-HEC (a) and HEC (b) solutions at 20° C., with strain=20%, and [polymers]=0.5 wt %.

The increases in the G' and G" values of the HHM-HEC solution caused by the addition of NaCl indicated that its three-dimensional network structure became more elastic, whereas the corresponding moduli of the HEC solution showed no such variation.

Figure 16:
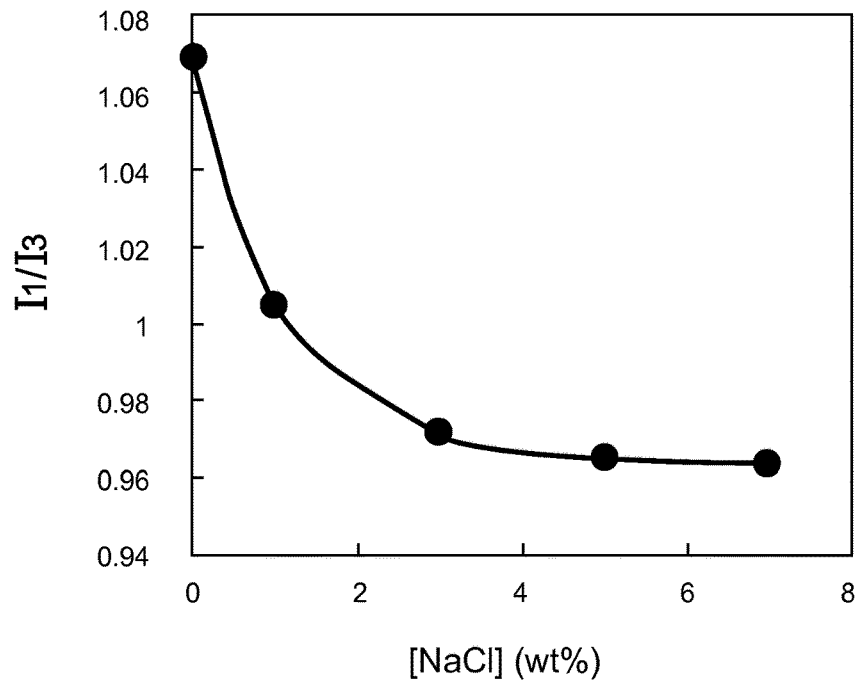
FIG. 16 illustrates $I_1/I_3$ ratios of the pyrene emission spectra dependence on the NaCl concentration for an HHM-HEC solution, in accordance with various embodiments.

The $I_1/I_3$ ratio of the pyrene monomer emission spectrum was calculated by measuring the hydrophobicity or the strength of hydrophobic association in the HHM-HEC solution. A decrease in the $I_1/I_3$ ratio indicates decreased mobility of the pyrene probe, that is, enhanced hydrophobicity in a solution. The $I_1/I_3$ ratios derived from the emission spectra of pyrene in the HHM-HEC solutions as a function of the NaCl content are shown in FIG. 16, which shows $I_1/I_3$ ratios of the pyrene emission spectra dependence on the NaCl concentration for an HHM-HEC solution at 25° C. having [HHM-HEC]=0.5 wt %. The pyrene probes appeared to exist in the vicinity of the alkyl microdomains of HHM-HEC, which were the only hydrophobic areas in the aqueous solution. The $I_1/I_3$ ratio decreased rapidly as the NaCl concentration increased, and reached a plateau at NaCl concentrations above about 5 wt %.

Figure 17A:
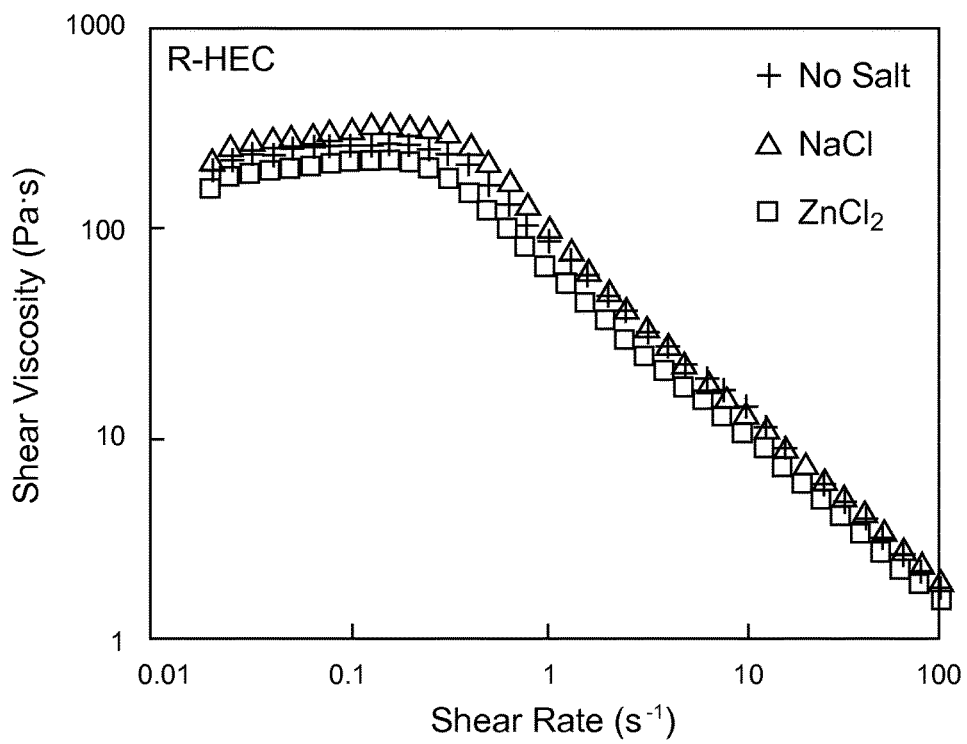
FIG. 17a illustrates shear viscosity versus shear rate for aqueous solutions of R-HEC (a) with and without salt addition, in accordance with various embodiments.
Figure 17B:
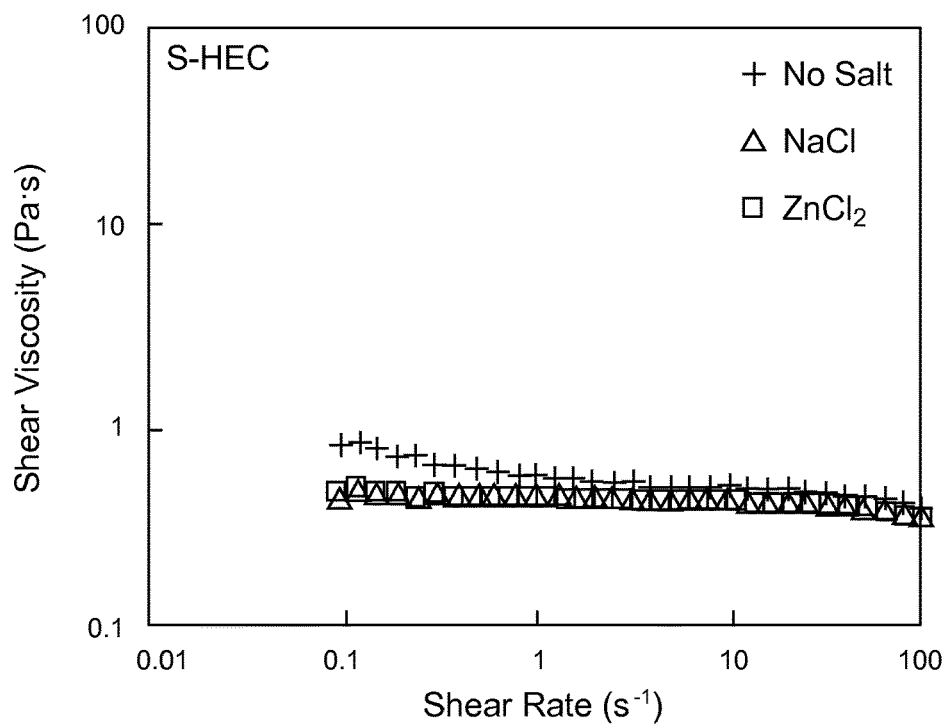
FIG. 17b illustrates shear viscosity versus shear rate for aqueous solutions of S-HEC (b) with and without salt addition, in accordance with various embodiments.

The effects of the added monovalent and divalent salts on the shear viscosity of R-HEC and S-HEC are shown in FIGS. 17a-b, which illustrate shear viscosity versus shear rate for aqueous solutions of the R-HEC (a) and S-HEC (b) with and without salt addition at 20° C., having [polymers]=0.5 wt %, [NaCl]=1 wt %, and [$ZnCl_2$]) 2 wt %.

Figure 18A:
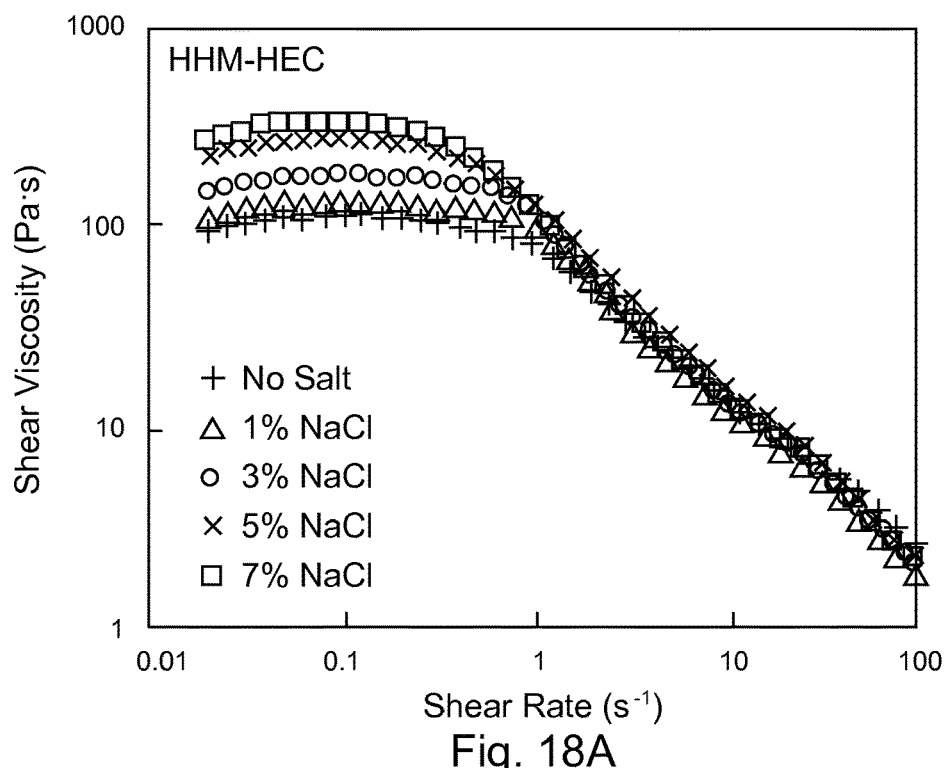
FIG. 18a illustrates shear viscosity versus shear rate for HHM-HEC having various NaCl concentrations, in accordance with various embodiments.
Figure 18B:
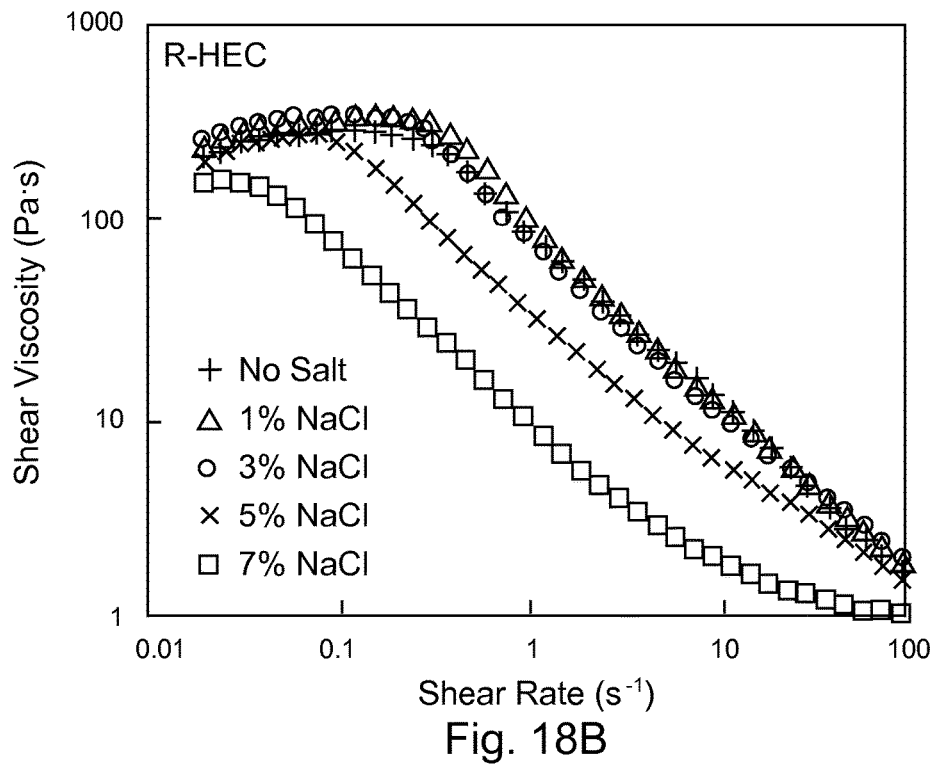
FIG. 18b illustrates shear viscosity versus shear rate for R-HEC having various NaCl concentrations, in accordance with various embodiments.
Figure 18C:
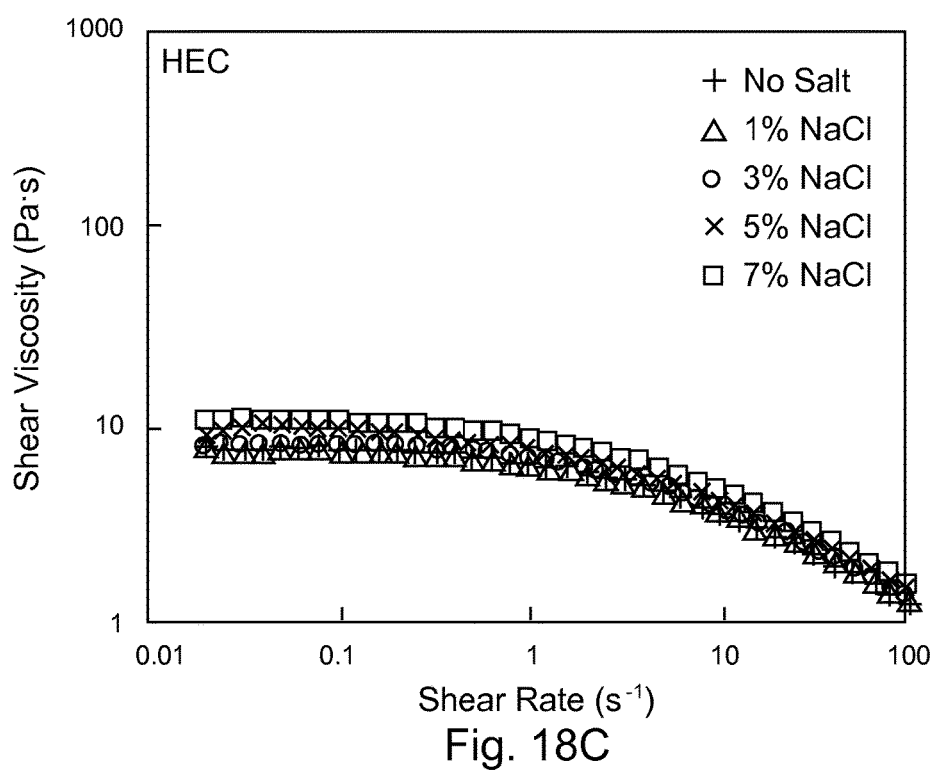
FIG. 18c illustrates shear viscosity versus shear rate for HEC having various NaCl concentrations, in accordance with various embodiments.

The effects of the NaCl concentration on the viscosities of the HHM-HEC, R-HEC, and HEC are shown in FIGS. 18a-c, which illustrate shear viscosity versus shear rate for HHM-HEC (a), R-HEC (b), and HEC (c) at 20° C., with [polymers]=0.5 wt %.

Figure 19:
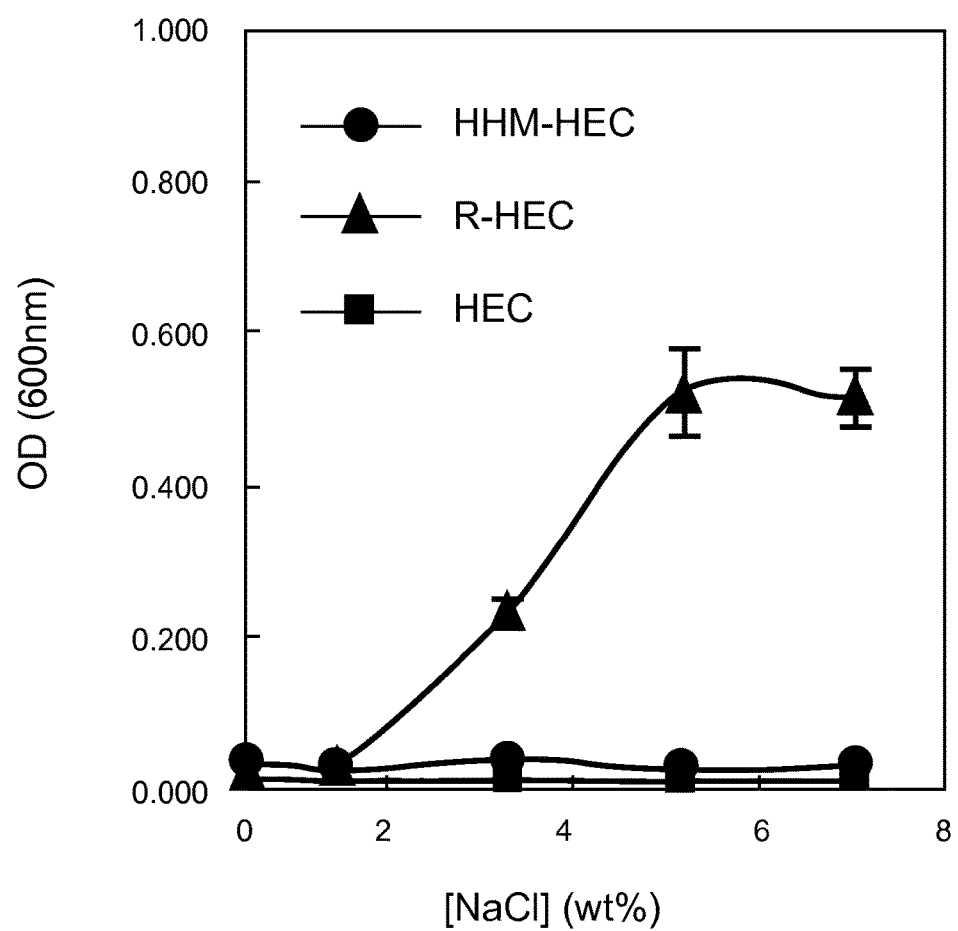
FIG. 19 illustrates turbidity as a function of the NaCl concentration for aqueous solutions of HEC and various HEC derivatives, in accordance with various embodiments.
Figure 20A:
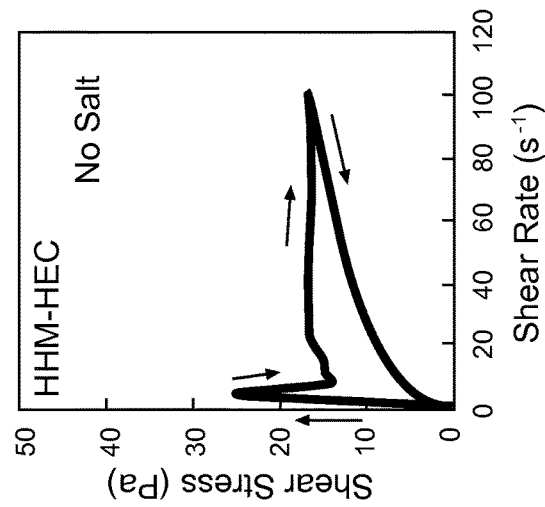
FIG. 20a illustrates a thixotropic loop of shear stress versus shear rate for an aqueous solution of HHM-HEC, in accordance with various embodiments.
Figure 20B:
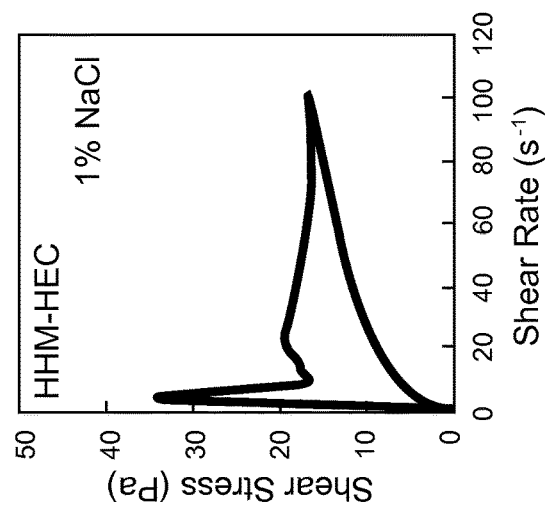
FIG. 20b illustrates a thixotropic loop of shear stress versus shear rate for an aqueous solution of HHM-HEC having an NaCl concentration of 1 wt %, in accordance with various embodiments.
Figure 20C:
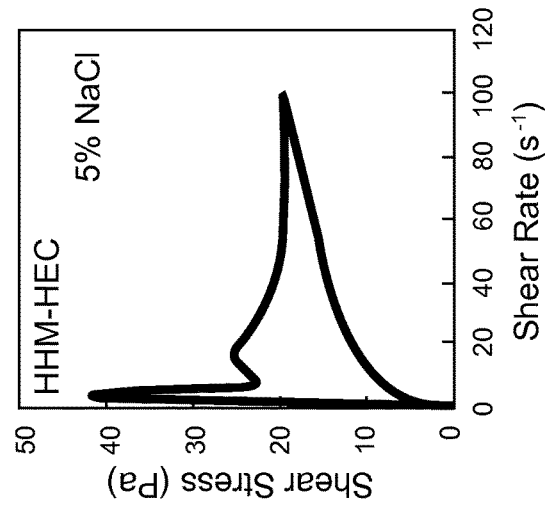
FIG. 20c illustrates a thixotropic loop of shear stress versus shear rate for an aqueous solution of HHM-HEC having an NaCl concentration of 5 wt %, in accordance with various embodiments.
Figure 20D:
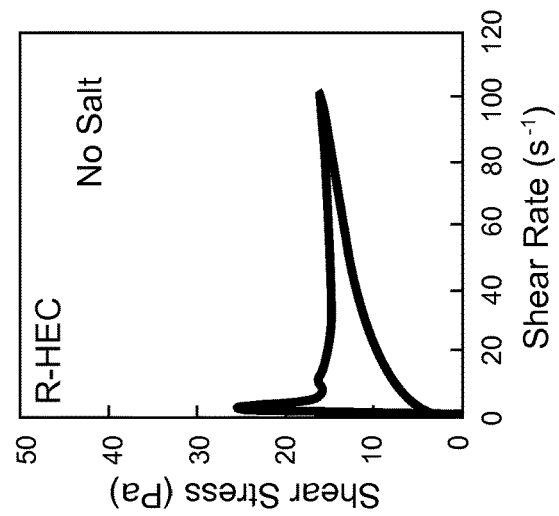
FIG. 20d illustrates a thixotropic loop of shear stress versus shear rate for an aqueous solution of R-HEC, in accordance with various embodiments.
Figure 20E:
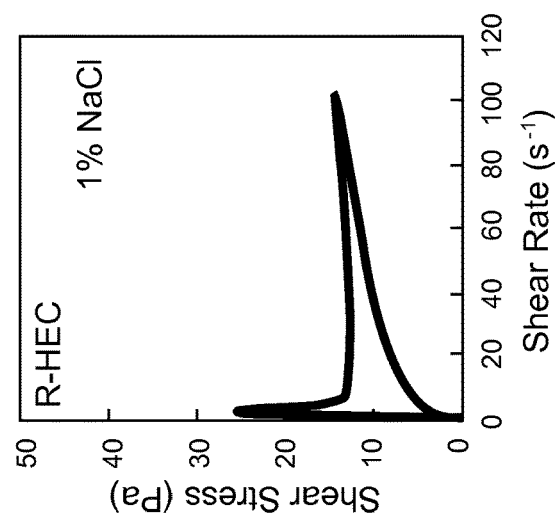
FIG. 20e illustrates a thixotropic loop of shear stress versus shear rate for an aqueous solution of R-HEC having an NaCl concentration of 1 wt %, in accordance with various embodiments.
Figure 20F:
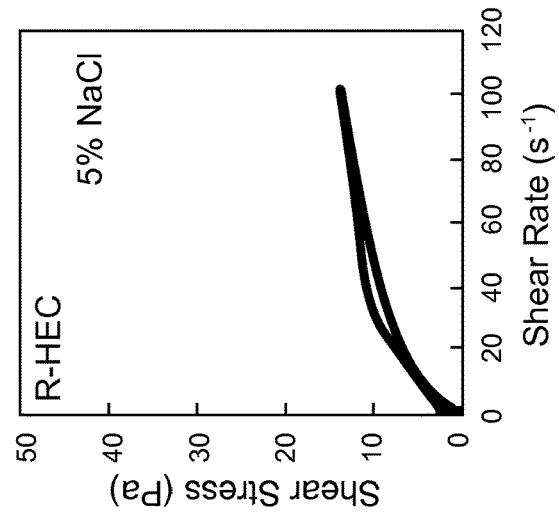
FIG. 20f illustrates a thixotropic loop of shear stress versus shear rate for an aqueous solution of R-HEC having an NaCl concentration of 1 wt %, in accordance with various embodiments.

The HHM-HEC solutions were optically clear at all NaCl concentrations studied, similar to the HEC solutions. FIG. 19 illustrates turbidity as a function of the NaCl concentration for aqueous solutions of HEC derivatives at 25° C., where each error bar represents the standard deviation of at least five measurements, and [polymers]=0.5 wt %.

According to the thixotropic loops of shear stress depending on the shear rate, the R-HEC solution in the absence of NaCl showed slightly greater hysteresis area than did the HHM-HEC solution. FIGS. 20a-f illustrate thixotropic loops of shear stress versus shear rate as a function of the NaCl concentration (0, 1 wt %, and 5 wt %) for aqueous solutions of HHM-HEC (a, b, c) and R-HEC (d, e, f) at 20° C., with [polymers]=0.5 wt %.

Figure 21A:
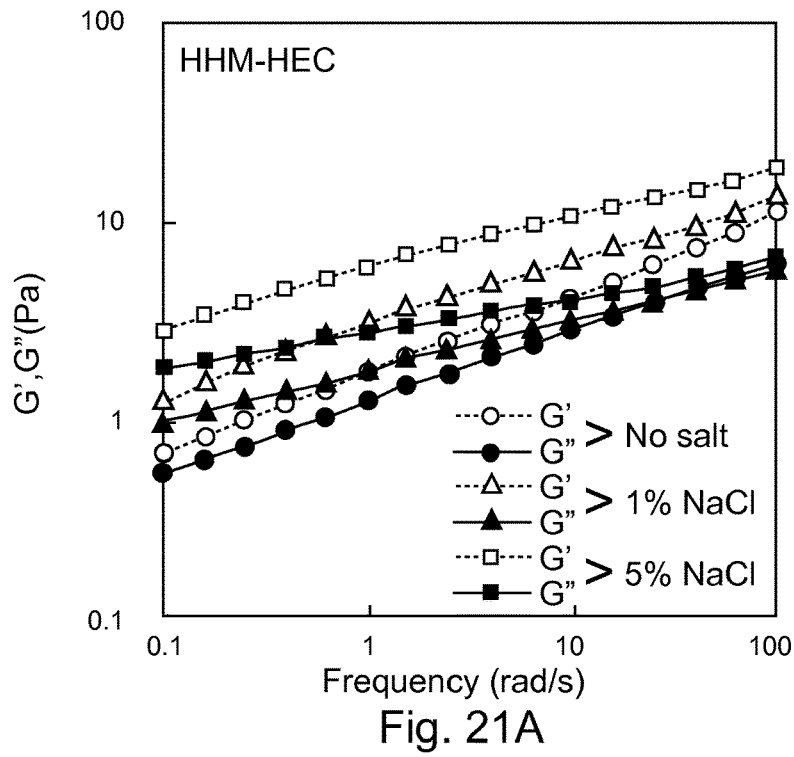
FIG. 21a illustrates storage (G') and loss (G") moduli dependence on the angular frequency for aqueous solutions of HHM-HEC with various concentrations of NaCl, in accordance with various embodiments.
Figure 21B:
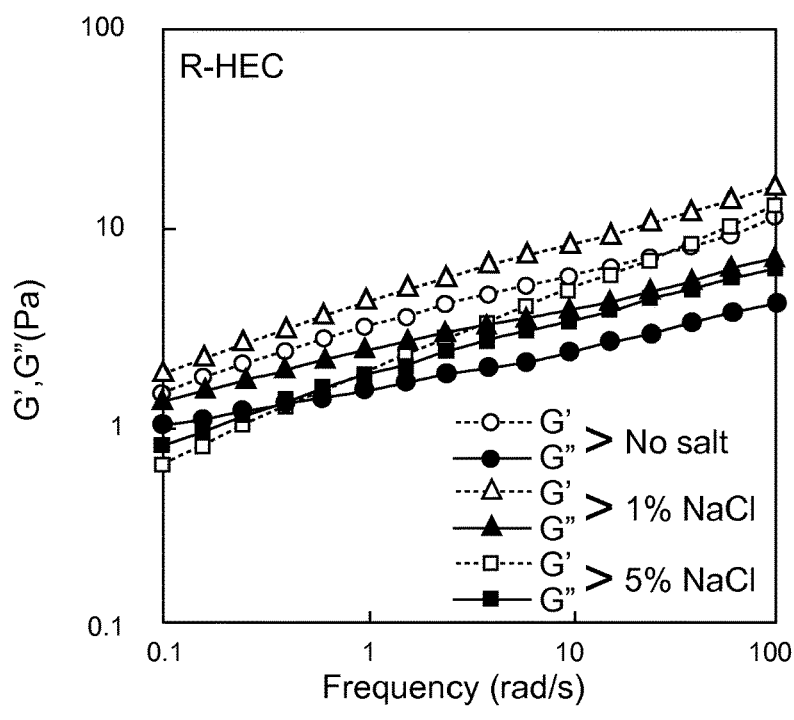
FIG. 21b illustrates storage (G') and loss (G") moduli dependence on the angular frequency for aqueous solutions of R-HEC with various concentrations of NaCl, in accordance with various embodiments.

The values of G' and G" for the HHM-HEC and R-HEC solutions were measured by varying the frequency from 0.1 to 100 Hz at 20% strain. FIGS. 21a-b illustrate storage (G')

and loss (G") moduli dependence on the angular frequency for aqueous solutions of the HEC derivatives with different concentrations of NaCl at 20° C., with strain=20%, and [polymers]=0.5 wt %. The values of the two moduli of the HHM-HEC solution increased as the NaCl concentration increased (FIG. 21a). In contrast, the values of G' and G" of R-HEC decreased notably when the NaCl concentration was increased from 1 to 5 wt % (FIG. 21b).

Figure 22A:
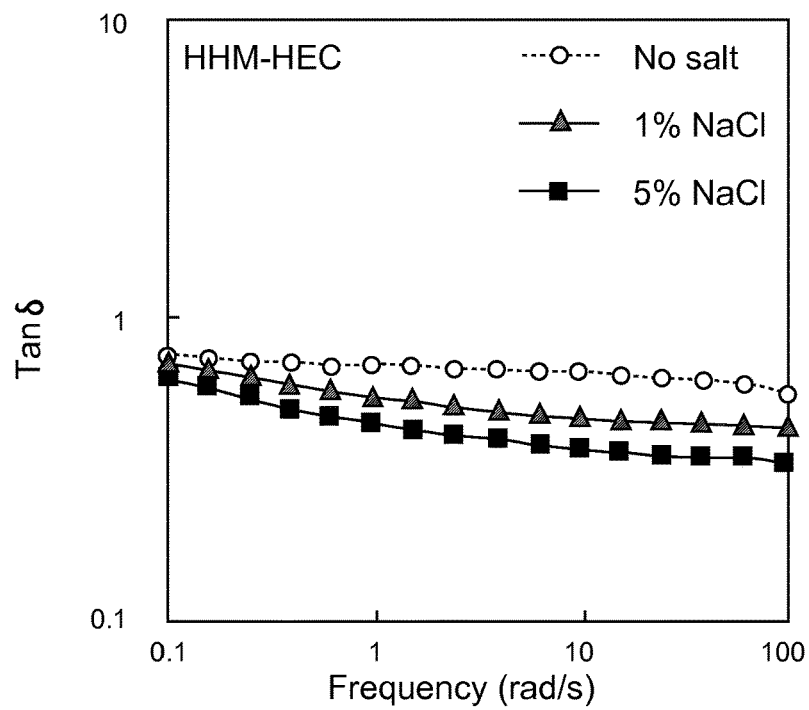
FIG. 22a illustrates loss tangent (tan δ) dependence on the angular frequency for an aqueous solution of HHM-HEC having various NaCl concentrations, in accordance with various embodiments.
Figure 22B:
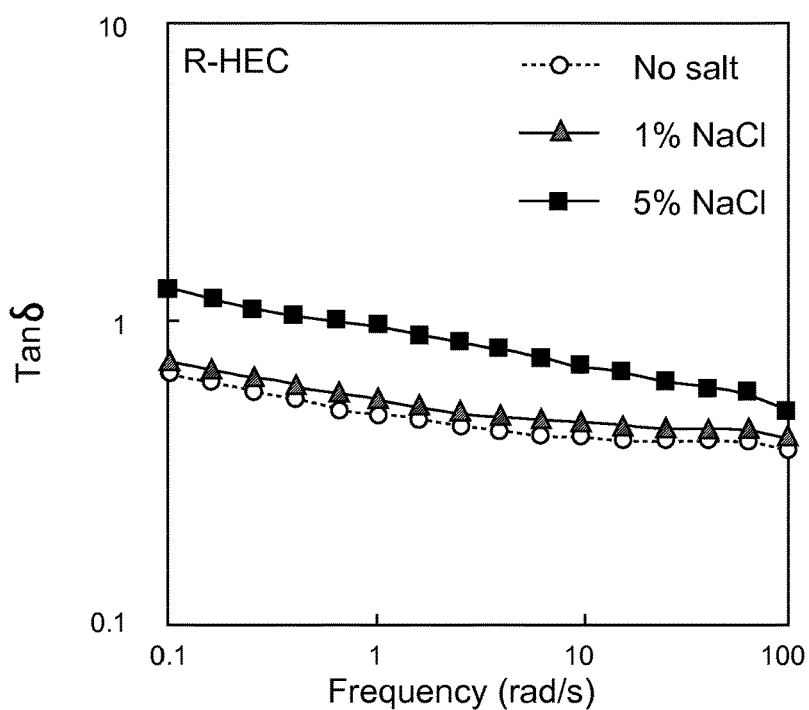
FIG. 22b illustrates loss tangent (tan δ) dependence on the angular frequency for aqueous solution of HEC having various NaCl concentrations, in accordance with various embodiments.

The tan δ of HHM-HEC decreased as the NaCl concentration increased, while that of R-HEC increased at a moderate rate. FIGS. 22a-b illustrate loss tangent (tan δ) dependence on the angular frequency for an aqueous solution of HHM-HEC (a) and HEC (b) having various NaCl concentrations. This suggested that the HHMHEC solution was transformed into a more elastic gel by the addition of salts, whereas the R-HEC solution was changed from an elastic gel to a viscous fluid.

Example 2.2. Summary

The solution viscosity of this amphiphilic polymer increased as the salt concentration increased. In a 1 wt % NaCl solution, HHM-HEC showed higher viscosity than did HEC and S-HEC, and equal viscosity to that of R-HEC. However, while R-HEC gradually lost viscosity and became turbid at NaCl concentrations above 3 wt %, HHM-HEC did not. This indicated that the salt tolerance of the HHM-HEC solution, which was a unique property of this polymer, resulted from the presence of the two substituents within the HHM-HEC molecule. Rheological and fluorometric analyses confirmed that hydrophobic associations between the alkyl chains increased the elasticity in high-concentration salt solutions, while the hydrophilic substituents maintained the solubility of the polymer. Moreover, the values of the viscosity and the dynamic moduli of the HHM-HEC solution with 1 wt % NaCl were found to be similar to those of the R-HEC solution without added salts. On the basis of these observations, a non-limiting theoretic mechanism for the increase in the HHM-HEC viscosity caused by the addition of salts can be: Added salts decrease the electrostatic repulsion between the hydrophilic substituents and enhance the interactions of the hydrophobic substituents. This process leads to the formation of a firmer and more rigid network structure, which allows the HHM-HEC solution to maintain its unique rheological properties, even at high salt concentrations.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of this invention as defined by the appended claims.

Additional Embodiments

The present invention provides for the following exemplary embodiments, the numbering of which is not to be construed as designating levels of importance:

Embodiment 1 provides a method of treating a subterranean formation, the method comprising: obtaining or providing a composition comprising a hydrophobically and hydrophilically modified polysaccharide (HHMP); and placing the composition in a subterranean formation.

Embodiment 2 provides the method of Embodiment 1, wherein the method is a method of hydraulic fracturing.

Embodiment 3 provides the method of any one of Embodiments 1-2, wherein the method is a method of drilling.

Embodiment 4 provides the method of any one of Embodiments 1-3, wherein the method is a method of gravel packing.

Embodiment 5 provides the method of any one of Embodiments 1-4, where in the composition further comprises a proppant.

Embodiment 6 provides the method of Embodiment 5, wherein the proppant comprises sand, gravel, bauxite, ceramic materials, glass materials, polymer materials, tetrafluoroethylene materials, nut shell materials, seed shell materials, fruit pit materials, wood, processed wood, hollow glass microspheres, and solid glass.

Embodiment 7 provides the method of any one of Embodiments 1-6, wherein a proppant or gravel is added to the composition, forming a mixture, and the placing of the composition in the subterranean formation comprises placing the mixture in the subterranean formation.

Embodiment 8 provides the method of Embodiment 7, wherein the proppant or gravel is about 0.001 wt % to about 99.999 wt % of the mixture.

Embodiment 9 provides the method of any one of Embodiments 7-8, wherein the proppant or gravel is about 50 wt % to about 98 wt % of the mixture.

Embodiment 10 provides the method of any one of Embodiments 1-9, wherein the obtaining or providing of the composition occurs above-surface.

Embodiment 11 provides the method of any one of Embodiments 1-10, wherein the obtaining or providing of the composition occurs downhole.

Embodiment 12 provides the method of any one of Embodiments 1-11, wherein the composition has about 0.000,000,1 wt % to about 50 wt % of the HHMP.

Embodiment 13 provides the method of any one of Embodiments 1-12, wherein the composition has about 0.001 wt % to about 50 wt % of the HHMP.

Embodiment 14 provides the method of any one of Embodiments 1-13, wherein above-surface the composition has a viscosity at standard temperature and pressure of about 0.01 cP to about 15,000 cP.

Embodiment 15 provides the method of any one of Embodiments 1-14, wherein above-surface the composition has a viscosity at standard temperature and pressure of about 0.02 cP to about 1,500 cP.

Embodiment 16 provides the method of any one of Embodiments 1-15, wherein at least one of during or after placing the composition in the subterranean formation the composition has a viscosity under downhole conditions of at least 50 cP.

Embodiment 17 provides the method of any one of Embodiments 1-16, wherein at least one of during or after placing the composition in the subterranean formation, the composition has a viscosity under downhole conditions of about 100 cP to about 1,000,000,000 cP.

Embodiment 18 provides the method of any one of Embodiments 1-17, wherein conditions downhole comprise a temperature of about −20° C. to about 600° C.

Embodiment 19 provides the method of any one of Embodiments 1-18, wherein conditions downhole comprise a temperature of about 0° C. to about 300° C.

Embodiment 20 provides the method of any one of Embodiments 1-19, wherein at standard temperature and pressure the composition has a viscosity of about 1 cP to about 1,000,000 cP per about 0.1 wt % to about 10 wt % of the HHMP in the composition.

Embodiment 21 provides the method of any one of Embodiments 1-20, wherein at standard temperature and pressure the composition has a viscosity of about 10 cP to about 100,000 cP per 1 wt % to about 5 wt % of the HHMP in the composition.

Embodiment 22 provides the method of any one of Embodiments 1-21, wherein at room temperature the composition has a yield strength of about 0.01 Pa to about 100,000 Pa.

Embodiment 23 provides the method of any one of Embodiments 1-22, wherein at room temperature the composition has a yield strength of about 1 Pa to about 10,000 Pa.

Embodiment 24 provides the method of any one of Embodiments 1-23, wherein at room temperature the composition has a static gel strength of about 0.01 Pa to about 100,000 Pa Embodiment 25 provides the method of any one of Embodiments 1-24, wherein at room temperature the composition has a static gel strength of about 1 Pa to about 10,000 Pa Embodiment 26 provides the method of any one of Embodiments 1-25, wherein the HHMP is substantially evenly wetted.

Embodiment 27 provides the method of any one of Embodiments 1-26, wherein the viscosity of the composition is substantially homogeneous.

Embodiment 28 provides the method of any one of Embodiments 1-27, wherein at standard temperature and pressure a variation in viscosity between two liquids in the composition is no more than about 500 cP.

Embodiment 29 provides the method of any one of Embodiments 1-28, wherein at standard temperature and pressure a variation in viscosity between two liquids in the composition is about 0.000,001 cP to about 100 cP.

Embodiment 30 provides the method of any one of Embodiments 1-29, wherein the composition further comprises at least one of brine, brackish water, seawater, water from a subterranean formation, and water recovered from a subterranean formation.

Embodiment 31 provides the method of any one of Embodiments 1-30, wherein the composition further comprises at least one salt chosen from calcium chloride, sodium chloride, potassium chloride, magnesium chloride, calcium bromide, sodium bromide, potassium bromide, calcium nitrate, sodium formate, potassium formate, and cesium formate.

Embodiment 32 provides the method of Embodiment 31, wherein the composition comprises about 0.000,000,001 wt % to about 30 wt % of the salt.

Embodiment 33 provides the method of any one of Embodiments 31-32, wherein the composition comprises about 0.000,1 wt % to about 30 wt % of the salt.

Embodiment 34 provides the method of any one of Embodiments 1-33, wherein the composition further comprises at least one ion that comprises an organic ion or an inorganic ion.

Embodiment 35 provides the method of Embodiment 34, wherein the ion is fluoride, chloride, bromide, iodide, nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate, acetate, formate, oxide, sulfide, nitride, arsenate, phosphate, arsenite, hydrogen phosphate, sulfate, thiosulfate, sulfite, carbonate, chromate, dichromate, peroxide, or oxalate.

Embodiment 36 provides the method of any one of Embodiments 34-35, wherein the ion is a cation selected from $Na^+$, $K^+$, $Ag^+$, $NH_4^+$, $Al^{3+}$, $Ca^{2+}$, $Cu^{2+}$, $Fe^{2+}$, $Fe^{3+}$, and $Mg^{2+}$.

Embodiment 37 provides the method of any one of Embodiments 34-36, wherein the ion is a cation selected from $Fe^{2+}$ and $Fe^{3+}$.

Embodiment 38 provides the method of any one of Embodiments 34-37, wherein the composition comprises about 0.000,000,001 wt % to about 30 wt % of the ion.

Embodiment 39 provides the method of any one of Embodiments 34-38, wherein the composition comprises about 0.000,1 wt % to about 30 wt % of the ion.

Embodiment 40 provides the method of any one of Embodiments 1-39, wherein the composition further comprises a crosslinker.

Embodiment 41 provides the method of Embodiment 40, wherein the crosslinker comprises at least one of chromium, aluminum, antimony, zirconium, titanium, calcium, boron, iron, silicon, copper, zinc, magnesium, and an ion thereof.

Embodiment 42 provides the method of any one of Embodiments 40-41, wherein the crosslinker comprises at least one of boric acid, borax, a borate, a $(C_1\text{-}C_{30})$hydrocarbylboronic acid, a $(C_1\text{-}C_{30})$hydrocarbyl ester of a $(C_1\text{-}C_{30})$hydrocarbylboronic acid, a $(C_1\text{-}C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, and aluminum citrate.

Embodiment 43 provides the method of any one of Embodiments 1-42, wherein the HHMP is crosslinked.

Embodiment 44 provides the method of any one of Embodiments 1-43, further comprising crosslinking the HHMP.

Embodiment 45 provides the method of Embodiment 44, wherein the crosslinking of the HHMP occurs at least one of above-surface or downhole.

Embodiment 46 provides the method of any one of Embodiments 1-45, wherein the composition further comprises a gel or crosslinked gel.

Embodiment 47 provides the method of Embodiment 46, wherein the gel or crosslinked gel comprises at least one of a linear polysaccharide and a poly$((C_2\text{-}C_{10})$alkenylene), wherein the $(C_2\text{-}C_{10})$alkenylene is substituted or unsubstituted.

Embodiment 48 provides the method of any one of Embodiments 46-47, wherein the gel or crosslinked gel comprises poly(acrylic acid) or $(C_1\text{-}C_5)$alkyl esters thereof, poly(methacrylic acid) or $(C_1\text{-}C_5)$alkyl esters thereof, poly(vinyl acetate), poly(vinyl alcohol), poly(ethylene glycol), poly(vinyl pyrrolidone), polyacrylamide, poly(hydroxyethyl methacrylate), acetan, alginate, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, derivatized guar, gum ghatti, gum arabic, locust bean gum, cellulose, and derivatized cellulose.

Embodiment 49 provides the method of any one of Embodiments 46-48, wherein the gel or crosslinked gel comprises cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

Embodiment 50 provides the method of any one of Embodiments 1-49, wherein the HHMP comprises a linear polysaccharide.

Embodiment 51 provides the method of any one of Embodiments 1-50, wherein the HHMP comprises a polysaccharide comprising at least one of acetan, alginate, alginic acid, cellulose, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, and a derivative thereof having —O—($R^9$)$_n$—OH groups in place of —OH groups, wherein at each occurrence $R^9$ is independently substituted or unsubstituted ($C_1$-$C_{20}$)hydrocarbylene interrupted or terminated by 0, 1, 2, or 3 of at least one of O, S, and substituted or unsubstituted N and at each occurrence n is independently about 2 to about 2,000.

Embodiment 52 provides the method of any one of Embodiments 1-51, wherein the hydrophilic modification of the HHMP comprises at least one —O—PG group, wherein PG is a hydrophilic group.

Embodiment 53 provides the method of Embodiment 52, wherein the —O—PG group is a —OH group before the hydrophilic modification.

Embodiment 54 provides the method of any one of Embodiments 52-53, wherein the HHMP has about 0.000,01 to about 0.999,99 PG groups per monosaccharide unit.

Embodiment 55 provides the method of any one of Embodiments 52-54, wherein the HHMP has about 0.05-0.60 PG groups per monosaccharide unit.

Embodiment 56 provides the method of any one of Embodiments 52-55, wherein at each occurrence PG is independently selected from the group consisting of —($C_0$-$C_{50}$)hydrocarbyl-A and -L-($C_0$-$C_{50}$)hydrocarbyl-A wherein hydrocarbyl is substituted or unsubstituted, wherein at each occurrence L is independently selected from the group consisting of substituted or unsubstituted ($C_1$-$C_{50}$)hydrocarbyl interrupted or terminated by 0, 1, 2, or 3 of at least one of O, S, and substituted or unsubstituted N, and —[$R^9$]$_n$— wherein at each occurrence $R^9$ is independently substituted or unsubstituted ($C_1$-$C_{20}$)hydrocarbylene interrupted or terminated by 0, 1, 2, or 3 of at least one of O, S, and substituted or unsubstituted N and at each occurrence n is independently about 2 to about 2,000; and at each occurrence A is independently selected from the group consisting of —C(O)O$^-$Cl$^+$, —S(O)(O)O$^-$Cl$^+$, and —P(O)(O)(O$^-$Cl$^+$)(O$^-$R$^+$), wherein at each occurrence Cl$^+$ is independently a counterion, and wherein at each occurrence R$^+$ is independently selected from the group consisting of H$^+$ and Cl$^+$.

Embodiment 57 provides the method of Embodiment 56, wherein PG is -L-($C_0$-$C_{10}$)alkyl-A.

Embodiment 58 provides the method of any one of Embodiments 56-57, wherein PG is —($C_1$-$C_5$)alkyl-A, and wherein alkyl is substituted with 0, 1, 2, or 3 —OH groups.

Embodiment 59 provides the method of any one of Embodiments 56-58, wherein PG is

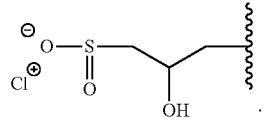

.

Embodiment 60 provides the method of any one of Embodiments 1-59, wherein the hydrophobic modification of the HHMP comprises at least one —O—NPG group, wherein NPG is a hydrophobic group.

Embodiment 61 provides the method of Embodiment 60, wherein the —O—NPG group is an —OH group before the hydrophobic modification.

Embodiment 62 provides the method of any one of Embodiments 60-61, wherein the HHMP has about 0.000,01 to about 0.999,99 NPG groups per monosaccharide unit.

Embodiment 63 provides the method of any one of Embodiments 60-62, wherein the HHMP has about 0.0015-0.0090 PG groups per monosaccharide unit.

Embodiment 64 provides the method of any one of Embodiments 60-63, wherein at each occurrence NPG is independently selected from the group consisting of —$R^{11}$ and -L-$R^{11}$, wherein at each occurrence $R^{11}$ is independently substituted or unsubstituted —($C_3$-$C_{50}$)hydrocarbyl interrupted or terminated by 0, 1, 2, or 3 of at least one of O, S, and substituted or unsubstituted N; and at each occurrence L is independently selected from the group consisting of substituted or unsubstituted ($C_1$-$C_{50}$)hydrocarbyl interrupted or terminated by 0, 1, 2, or 3 of at least one of O, S, and substituted or unsubstituted N, and —[$R^9$]$_n$— wherein at each occurrence $R^9$ is independently substituted or unsubstituted ($C_1$-$C_{20}$)hydrocarbylene interrupted or terminated by 0, 1, 2, or 3 of at least one of O, S, and substituted or unsubstituted N and at each occurrence n is independently about 2 to about 2,000.

Embodiment 65 provides the method of Embodiment 64, wherein NPG is -L-($C_{10}$-$C_{50}$)alkyl.

Embodiment 66 provides the method of any one of Embodiments 64-65, wherein NPG is —($C_1$-$C_5$)alkyl-O—($C_{10}$-$C_{50}$)alkyl, wherein ($C_1$-$C_5$)alkyl is substituted with 0, 1, 2, or 3 —OH groups.

Embodiment 67 provides the method of any one of Embodiments 64-66, wherein NPG is

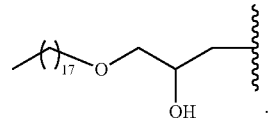

.

Embodiment 68 provides the method of any one of Embodiments 1-67, wherein the HHMP comprises a monosaccharide repeating unit having the structure

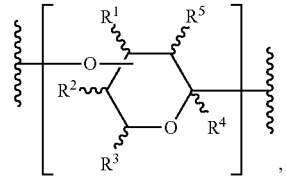

, wherein at each occurrence each of $R^1$, $R^2$, $R^3$, $R^4$, and $R^5$ are independently selected from the group consisting of —$R^7$ and —O$R^7$; at each occurrence $R^7$ is independently selected from the group consisting of —H and -L-$R^8$; at each occurrence $R^8$ is independently selected from the group consisting of —$R^6$ and —O$R^6$, wherein at each occurrence $R^6$ is independently selected from —H, —PG, and —NPG, wherein at each occurrence PG is independently a hydrophilic group and at each occurrence NPG is independently a hydrophobic group; at each occurrence L is independently selected from the group consisting of substituted or unsubstituted $(C_1-C_{50})$hydrocarbyl interrupted or terminated by 0, 1, 2, or 3 of at least one of O, S, and substituted or unsubstituted N, and $—[R^9]_n—$ wherein at each occurrence $R^9$ is independently substituted or unsubstituted $(C_1-C_{20})$ hydrocarbylene interrupted or terminated by 0, 1, 2, or 3 of at least one of O, S, and substituted or unsubstituted N and at each occurrence n is independently about 2 to about 2,000; and wherein the polysaccharide has at least one PG group and at least one NPG group.

Embodiment 69 provides the method of Embodiment 68, wherein the HHMP has the structure

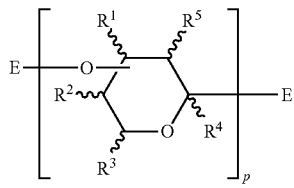

wherein E is independently at each occurrence selected from the group consisting of —H, —$R^7$, and —$OR^7$, and wherein p is about 100 to about 50,000

Embodiment 70 provides the method of Embodiment 69, wherein p is about 1,000 to about 20,000.

Embodiment 71 provides the method of any one of Embodiments 68-70, wherein the HHMP comprises a monosaccharide repeating unit having the structure

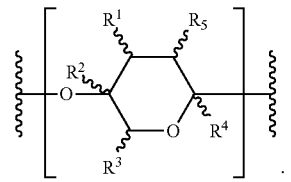

Embodiment 72 provides the method of any one of Embodiments 68-71, wherein the HHMP comprises a monosaccharide repeating unit having the structure

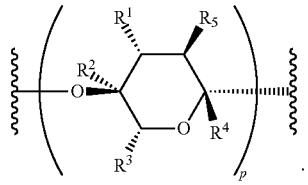

Embodiment 73 provides the method of any one of Embodiments 68-72, wherein at each occurrence L is independently selected from the group consisting of substituted or unsubstituted $(C_1-C_{10})$alkyl interrupted or terminated by 0, 1, 2, or 3 oxygen atoms, and $—[R^9]_n—$ wherein at each occurrence $R^9$ is independently substituted or unsubstituted $(C_1-C_{10})$alkyl interrupted or terminated by 0, 1, 2, or 3 O and at each occurrence n is independently about 2 to about 20.

Embodiment 74 provides the method of any one of Embodiments 68-73, wherein at each occurrence L is independently selected from the group consisting of $(C_1-C_5)$ alkyl substituted with 0, 1, 2, or 3 —OH and interrupted or terminated by 0, 1, 2, or 3 oxygen atoms, and $—[R^9]_n—$ wherein at each occurrence $R^9$ is independently $(C_1-C_5)$ alkyl substituted with 0, 1, 2, or 3 —OH, interrupted or terminated by 0, 1, 2, or 3 oxygen atoms, and at each occurrence n is independently about 2 to about 5.

Embodiment 75 provides the method of any one of Embodiments 68-74, wherein $R^2=R^4=$—H, $R^1=$—OH, $R^5=$—O—$(C_1-C_5)$alkyl-OH, and $R^3=$—$(C_1-C_5)$alkyl-O—$(C_1-C_5)$alkyl-O—$R^6$.

Embodiment 76 provides the method of any one of Embodiments 68-75, wherein $R^2=R^4=$—H, $R^1=$—OH, $R^5=$—O-ethyl-OH, and $R^3=$-methyl-O-ethyl-O—$R^6$.

Embodiment 77 provides the method of any one of Embodiments 68-76, wherein the HHMP comprises a monosaccharide repeating unit having the structure

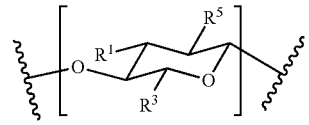

Embodiment 78 provides the method of any one of Embodiments 68-77, wherein the HHMP comprises a monosaccharide repeating unit having the structure

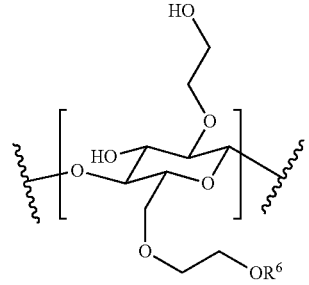

Embodiment 79 provides the method of any one of Embodiments 68-78, wherein the HHMP comprises, in a random or block copolymer arrangement, the structure

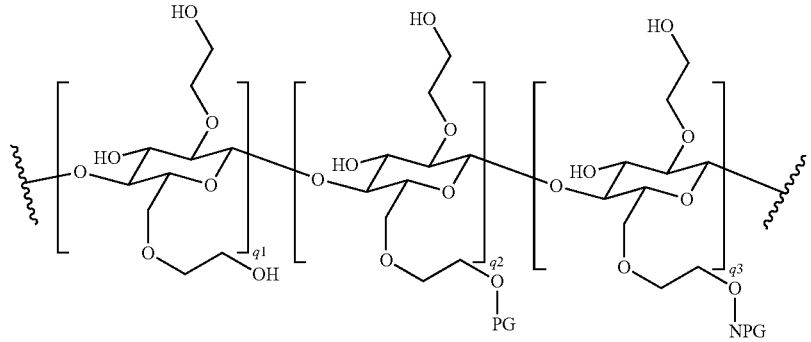

Embodiment 80 provides the method of Embodiment 79, wherein the HHMP comprises, in a random or block copolymer arrangement, the structure

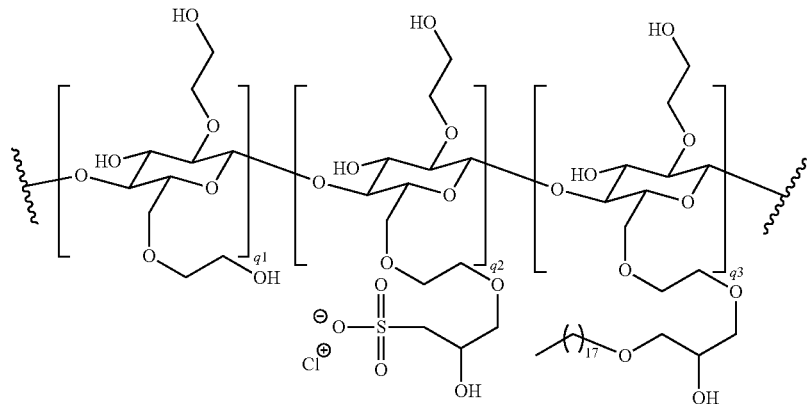

Embodiment 81 provides the method of any one of Embodiments 79-80, wherein q2/(q1+q2+q3) is about 0.000,01 to about 0.999,99.

Embodiment 82 provides the method of any one of Embodiments 79-81, wherein q2/(q1+q2+q3) is about 0.05 to about 0.60

Embodiment 83 provides the method of any one of Embodiments 79-82, wherein q3/(q1+q2+q3) is about 0.000,01 to about 0.999,99

Embodiment 84 provides the method of any one of Embodiments 79-83, wherein q3/(q1+q2+q3) is about 0.0015 to about 0.0090

Embodiment 85 provides the method of any one of Embodiments 79-84, wherein at each occurrence $CI^+$ is selected from the group consisting of $Na^+$, $K^+$, $Li^+$, $Zn^+$, $NH_4+$, $Ca^{2+}$, $Mg^{2+}$, $Zn^{2+}$, and $Al^{3+}$.

Embodiment 86 provides the method of any one of Embodiments 1-85, wherein the HHMP has a molecular weight of about 500 g/mol to about 100,000,000 g/mol.

Embodiment 87 provides the method of any one of Embodiments 1-86, wherein the HHMP has a molecular weight of about 1,000 g/mol to about 5,000,000 g/mol.

Embodiment 88 provides the method of any one of Embodiments 1-87, further comprising combining the composition with an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture, wherein the placing the composition in the subterranean formation comprises placing the mixture in the subterranean formation.

Embodiment 89 provides the method of Embodiment 88, wherein the cementing fluid comprises Portland cement, pozzolana cement, gypsum cement, high alumina content cement, slag cement, silica cement, or a combination thereof.

Embodiment 90 provides the method of any one of Embodiments 1-89, wherein at least one of prior to, during, and after the placing of the composition in the subterranean formation, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

Embodiment 91 provides the method of any one of Embodiments 1-90, wherein the composition further comprises water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof.

Embodiment 92 provides the method of any one of Embodiments 1-91, wherein the placement of the composition in the subterranean formation comprises fracturing at least part of the subterranean formation to form at least one subterranean fracture.

Embodiment 93 provides the method of any one of Embodiments 1-92, wherein the composition further comprises a proppant, a resin-coated proppant, an encapsulated resin, or a combination thereof.

Embodiment 94 provides the method of any one of Embodiments 1-93, wherein the composition comprises a payload material.

Embodiment 95 provides the method of Embodiment 94, further comprising using the composition to deposit at least part of the payload material downhole.

Embodiment 96 provides the method of Embodiment 95, wherein the at least part of the payload material is deposited in a subterranean fracture.

Embodiment 97 provides the method of any one of Embodiments 94-96, wherein the payload material comprises a proppant, a resin-coated proppant, a curable material, an encapsulated resin, a resin, a Portland cement, a pozzolana cement, a gypsum cement, a high alumina content cement, a slag cement, a silica cement, a cementitous kiln dust, fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

Embodiment 98 provides a method of treating a subterranean formation, the method comprising: obtaining or providing a composition comprising a hydrophobically and hydrophilically modified polysaccharide (HHMP) comprising a monosaccharide repeating unit having the structure to about 0.999,99 NPG groups per monosaccharide unit; and placing the composition in a subterranean formation.

Embodiment 99 provides a system comprising: a composition comprising a hydrophobically and hydrophilically modified polysaccharide (HHMP); and a subterranean formation comprising the composition therein.

Embodiment 100 provides a composition for treatment of a subterranean formation, the composition comprising: a hydrophobically and hydrophilically modified polysaccharide (HHMP).

Embodiment 101 provides the composition of Embodiment 100, wherein the composition further comprises a downhole fluid.

Embodiment 102 provides the composition of any one of Embodiments 100-101, wherein the composition is a composition for fracturing of a subterranean formation.

Embodiment 103 provides the composition of any one of Embodiments 100-102, wherein the HHMP comprises, in a random or block copolymer arrangement, the structure

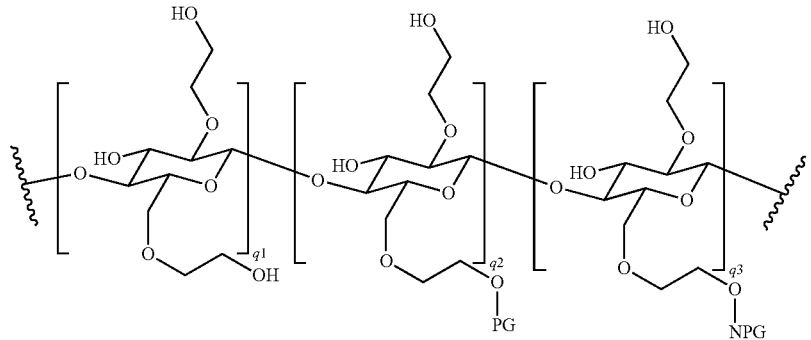

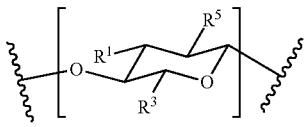

wherein $R^1$=—OH, $R^5$=—O—$(C_1\text{-}C_5)$alkyl-OH, and $R^3$=—$(C_1\text{-}C_5)$alkyl-O—$(C_1\text{-}C_5)$alkyl-O—$R^6$; at each occurrence $R^6$ is independently selected from —H, —PG, and —NPG; at each occurrence hydrophilic group PG is independently -L-$(C_0\text{-}C_{10})$alkyl-A, wherein at each occurrence A is independently selected from the group consisting of —C(O)O$^-$ CI$^+$, —S(O)(O)O$^-$CI$^+$, and —P(O)(O)(O$^-$CI$^+$)(O$^-$R$^+$), wherein at each occurrence C is independently a counterion, and wherein at each occurrence R$^+$ is independently selected from the group consisting of H$^+$ and CI$^+$ wherein at each occurrence CI$^+$ is selected from the group consisting of Na$^+$, K$^+$, Li$^+$, Zn$^+$, and NH$_4^+$; at each occurrence L is independently selected from the group consisting of $(C_1\text{-}C_5)$alkyl substituted with 0, 1, 2, or 3 —OH and interrupted or terminated by 0, 1, 2, or 3 oxygen atoms, and —[R$^9$]$_n$— wherein at each occurrence R$^9$ is independently $(C_1\text{-}C_5)$alkyl substituted with 0, 1, 2, or 3 —OH, interrupted or terminated by 0, 1, 2, or 3 oxygen atoms, and at each occurrence n is independently about 2 to about 5; wherein the HHMP has about 0.000,01 to about 0.999,99 PG groups per monosaccharide unit and the HHMP has about 0.000,01 wherein at each occurrence hydrophilic group PG is independently -L-$(C_0\text{-}C_{10})$alkyl-A, wherein at each occurrence A is independently selected from the group consisting of —C(O)O$^-$CI$^+$, —S(O)(O)O$^-$CI$^+$, and —P(O)(O)(O$^-$CI$^+$)(O$^-$R$^+$), wherein at each occurrence CI$^+$ is independently a counterion, and wherein at each occurrence R$^+$ is independently selected from the group consisting of H$^+$ and CI$^+$ wherein at each occurrence CI$^+$ is selected from the group consisting of Na$^+$, K$^+$, Li$^+$, Zn$^+$, and NH$_4^+$; at each occurrence L is independently selected from the group consisting of $(C_1\text{-}C_5)$alkyl substituted with 0, 1, 2, or 3 —OH and interrupted or terminated by 0, 1, 2, or 3 oxygen atoms, and —[R$^9$]$_n$— wherein at each occurrence R$^9$ is independently $(C_1\text{-}C_5)$alkyl substituted with 0, 1, 2, or 3 —OH, interrupted or terminated by 0, 1, 2, or 3 oxygen atoms, and at each occurrence n is independently about 2 to about 5; at each occurrence hydrophobic group NPG is independently -L-$(C_{10}\text{-}C_{50})$alkyl; and q2/(q1+q2+q3) is about 0.05-0.60, and q3/(q1+q2+q3) is about 0.0015 to about 0.0090.

Embodiment 104 provides a method of preparing a composition for treatment of a subterranean formation, the method comprising: forming a composition comprising a hydrophobically and hydrophilically modified polysaccharide (HHMP).

Embodiment 105 provides the apparatus or method of any one or any combination of Embodiments 1-104 optionally configured such that all elements or options recited are available to use or select from.

What is claimed is:

1. A method of treating a subterranean formation, the method comprising:
   placing in the subterranean formation a composition comprising a hydrophobically and hydrophilically modified polysaccharide (HHMP), and
   0.01 to about 30 wt. %, based on the total weight of the composition, of a salt,
   wherein the composition has a yield strength of about 0.01 Pa to about 100,000 Pa.

2. The method of claim 1, wherein the method comprises hydraulic fracturing, drilling, gravel packing, or a combination thereof.

3. The method of claim 1, wherein the HHMP is cross-linked.

4. The method of claim 1, wherein the HHMP comprises a linear polysaccharide.

5. The method of claim 1, wherein the HHMP comprises a polysaccharide comprising at least one of acetan, alginate, alginic acid, cellulose, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, and a derivative thereof having —O—$(R^9)_n$—OH groups in place of —OH groups, wherein at each occurrence $R^9$ is independently substituted or unsubstituted $(C_1-C_{20})$hydrocarbylene interrupted or terminated by 0, 1, 2, or 3 of at least one of O, S, and substituted or unsubstituted N and at each occurrence n is independently about 2 to about 2,000.

6. The method of claim 1, wherein the hydrophilic modification of the HHMP comprises at least one —O-PG group, wherein PG is a hydrophilic group.

7. The method of claim 6, wherein at each occurrence PG is independently selected from the group consisting of —$(C_0-C_{50})$hydrocarbyl-A and -L-$(C_0-C_{50})$hydrocarbyl-A, wherein hydrocarbyl is substituted or unsubstituted, wherein:
   at each occurrence L is independently selected from the group consisting of:
      substituted or unsubstituted $(C_1-C_{50})$hydrocarbyl interrupted or terminated by 0, 1, 2, or 3 of at least one of O, S, and substituted or unsubstituted N, and
      —$[R^9]_n$— wherein at each occurrence $R^9$ is independently substituted or unsubstituted $(C_1-C_{20})$hydrocarbylene interrupted or terminated by 0, 1, 2, or 3 of at least one of O, S, and substituted or unsubstituted N and at each occurrence n is independently about 2 to about 2,000; and
   at each occurrence A is independently selected from the group consisting of —C(O)O⁻CI⁺, —S(O)(O)O⁻CI⁺, and —P(O)(O)(O⁻CI⁺)(O⁻R⁺), wherein at each occurrence CI⁺ is independently a counterion, and wherein at each occurrence R⁺ is independently selected from the group consisting of H⁺ and CI⁺.

8. The method of claim 7, wherein PG is:

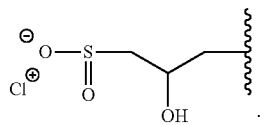

9. The method of claim 1, wherein the hydrophobic modification of the HHMP comprises at least one —O-NPG group, wherein NPG is a hydrophobic group.

10. The method of claim 9, wherein at each occurrence NPG is independently selected from the group consisting of —$R^{11}$ and -L-$R^{11}$, wherein:
   at each occurrence $R^{11}$ is independently substituted or unsubstituted —$(C_3-C_{50})$hydrocarbyl interrupted or terminated by 0, 1, 2, or 3 of at least one of O, S, and substituted or unsubstituted N; and
   at each occurrence L is independently selected from the group consisting of:
      substituted or unsubstituted $(C_1-C_{50})$hydrocarbyl interrupted or terminated by 0, 1, 2, or 3 of at least one of O, S, and substituted or unsubstituted N, and
      —$[R^9]_n$— wherein at each occurrence $R^9$ is independently substituted or unsubstituted $(C_1-C_{20})$hydrocarbylene interrupted or terminated by 0, 1, 2, or 3 of at least one of O, S, and substituted or unsubstituted N and at each occurrence n is independently about 2 to about 2,000.

11. The method of claim 10, wherein NPG is -L-$(C_{10}-C_{50})$alkyl.

12. The method of claim 10, wherein NPG is —$(C_1-C_5)$alkyl-O—$(C_{10}-C_{50})$alkyl, wherein $(C_1-C_5)$alkyl is substituted with 0, 1, 2, or 3 —OH groups.

13. The method of claim 10, wherein NPG is:

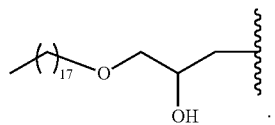

14. The method of claim 1, wherein the HHMP comprises a monosaccharide repeating unit having the structure:

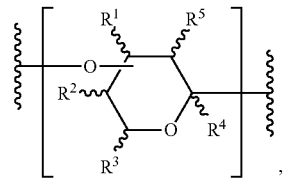

wherein at each occurrence each of $R^1$, $R^2$, $R^3$, $R^4$, and $R^5$ are independently selected from the group consisting of —$R^7$ and —$OR^7$;
   at each occurrence $R^7$ is independently selected from the group consisting of —H and -L-$R^8$;
   at each occurrence $R^8$ is independently selected from the group consisting of —$R^6$ and —$OR^6$, wherein at each occurrence $R^6$ is independently selected from —H, -PG, and -NPG, wherein at each occurrence PG is independently a hydrophilic group and at each occurrence NPG is independently a hydrophobic group;
   at each occurrence L is independently selected from the group consisting of:
      substituted or unsubstituted $(C_1-C_{50})$hydrocarbyl interrupted or terminated by 0, 1, 2, or 3 of at least one of O, S, and substituted or unsubstituted N, and
      —$[R^9]_n$— wherein at each occurrence $R^9$ is independently substituted or unsubstituted $(C_1-C_{20})$hydrocarbylene interrupted or terminated by 0, 1, 2, or 3 of at least one of O, S, and substituted or unsubstituted N and at each occurrence n is independently about 2 to about 2,000; and wherein the polysaccharide has at least one PG group and at least one NPG group.

15. The method of claim 14, wherein the HHMP comprises a monosaccharide repeating unit having the structure:

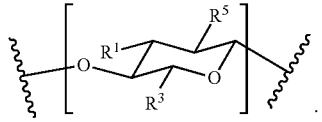

16. The method of claim 14, wherein the HHMP comprises a monosaccharide repeating unit having the structure:

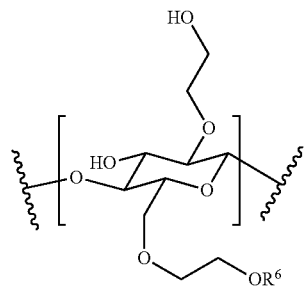

17. The method of claim 14, wherein the HHMP comprises, in a random or block copolymer arrangement, the structure:

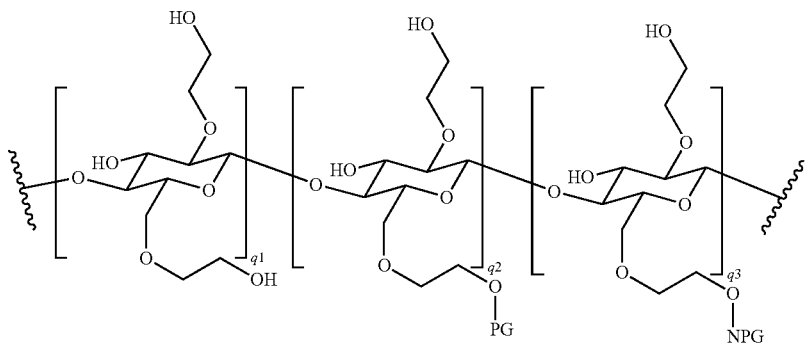

18. The method of claim 17, wherein the HHMP comprises, in a random or block copolymer arrangement, the structure:

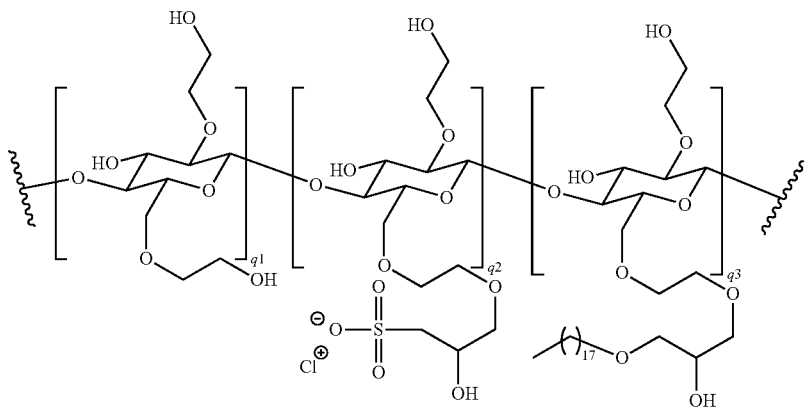

19. A system for performing the method of claim 1, the system comprising:
- a tubular disposed in the subterranean formation; and
- a pump configured to pump the composition comprising the hydrophobically and hydrophilically modified polysaccharide (HHMP) in the subterranean formation through the tubular.

* * * * *